(12) United States Patent
Soldano et al.

(10) Patent No.: US 8,134,851 B2
(45) Date of Patent: Mar. 13, 2012

(54) SECONDARY SIDE SYNCHRONOUS RECTIFIER FOR RESONANT CONVERTER

(75) Inventors: Marco Soldano, San Jose, CA (US); Adnaan Mustafa Lokhandwala, Manchester, NH (US)

(73) Assignee: International Rectifier Corporation, El Segundo, CA (US)

( * ) Notice: Subject to any disclaimer, the term of this patent is extended or adjusted under 35 U.S.C. 154(b) by 344 days.

(21) Appl. No.: 12/134,733

(22) Filed: Jun. 6, 2008

(65) Prior Publication Data
US 2009/0016083 A1    Jan. 15, 2009

Related U.S. Application Data

(63) Continuation-in-part of application No. 10/978,719, filed on Nov. 1, 2004, now Pat. No. 7,408,796.

(60) Provisional application No. 60/942,332, filed on Jun. 6, 2007, provisional application No. 60/517,333, filed on Nov. 4, 2003.

(51) Int. Cl.
  *H02M 7/217* (2006.01)
  *H02M 3/335* (2006.01)
(52) U.S. Cl. ..................... 363/127; 363/21.06
(58) Field of Classification Search ............... 363/21.02, 363/21.03, 21.06, 21.14, 88, 89, 127
See application file for complete search history.

(56) References Cited

U.S. PATENT DOCUMENTS

| 5,173,849 A | 12/1992 | Brooks |
| 5,736,890 A | 4/1998 | Yee et al. |
| 6,038,150 A | 3/2000 | Yee et al. |
| 6,055,170 A | 4/2000 | Yee |
| 6,271,712 B1 | 8/2001 | Ball |
| 6,353,544 B1 | 3/2002 | Lau |

(Continued)

FOREIGN PATENT DOCUMENTS

EP    0 891 038 A1    1/1999

(Continued)

OTHER PUBLICATIONS

J. A. Cobos, et al., "Study of the Applicability of Self-Driven Synchronous Rectification to Resonant Topologies," Power Electronics Specialists Conference, IEEE, 1992 (pp. 933-940).

(Continued)

*Primary Examiner* — Jessica Han
(74) *Attorney, Agent, or Firm* — Farjami & Farjami LLP

(57) ABSTRACT

A resonant converter including a primary side switching stage having high- and low-side switches series connected at a switching node and controlled by a primary side controller; a transformer having a primary coil and a secondary coil, the secondary coil having at least one pair of portions series connected at a node, a resonant tank formed by series connecting the primary coil to the switching node with a first inductor and a first capacitor; at least one pair of first and second secondary side switches connected to the at least one pair of portions, respectively, the first and second secondary side switches of each pair being used for synchronous rectification; and a secondary side controller to control and drive the first and second secondary side switches of each pair by sensing voltage across each secondary side switch and determining a turn ON and turn OFF transition for the first and second secondary side switches in close proximity to a point in time when there is zero current through the secondary side switch to achieve synchronous rectification.

16 Claims, 27 Drawing Sheets

U.S. PATENT DOCUMENTS

| | | | |
|---|---|---|---|
| 6,442,048 | B1 | 8/2002 | Sun et al. |
| 6,456,106 | B1 | 9/2002 | Yee |
| 6,535,400 | B2 | 3/2003 | Bridge |
| 6,934,166 | B2 * | 8/2005 | Vinciarelli .................. 363/17 |
| 6,974,098 | B2 * | 12/2005 | Keller ...................... 241/169 |
| 7,173,835 | B1 * | 2/2007 | Yang ............................ 363/89 |
| 2001/0038546 | A1 | 11/2001 | Abdoulin |
| 2003/0067795 | A1 * | 4/2003 | Dubhashi |
| 2008/0285312 | A1 * | 11/2008 | Fu et al. .................. 363/21.06 |

FOREIGN PATENT DOCUMENTS

| | | |
|---|---|---|
| EP | 1 067 667 A1 | 1/2001 |
| JP | 2003-224979 | 8/2003 |
| JP | 2003-309978 | 10/2003 |
| JP | 2004-519991 | 7/2004 |
| WO | WO 02/084873 A1 | 10/2002 |

OTHER PUBLICATIONS

Bo Yang, "Topology Investigation. For Front End DC/DC Power Conversion for Distributed Power System," Dissertation, Virginia Tech, Blacksburg, VA, Sep. 2003 (16 pages).

Adnaan Lokhandwala, et al. "Novel Output Rectification Controller IC Improves Efficiency & Thermal Performance in External AC-DC Power Supplies," International Rectifier SMPS Applications Engineering, (pp. 1-5).

Adnaan Lokhandwala, et al., "Dual SmartRectifier™—DirectFET Chipset Solution Overcomes Package Induced Sensing Limitations Allowing High Performance Synchronous Output Rectification in LCD TV Power Supplies," International Rectifier SMPS Applications Engineering (6 pages).

B. Yang, et al., "LLC Resonant Converter for Front End DC/DC Conversion," IEEE-APEC 2002, pp. 1108-1112.

Gerry Moschopoulos, et al., "A Series Resonant DC/DC Converter with Asymmetrical PWM and Synchronous Rectification," IEEE 2000, pp. 1522-1527.

Maurizio Salato, et al. "Smart Rectifier™ Increases Power Density in Flyback Topologies While Reducing System Complexity," Proceedings of PCIM China 2006, International Rectifier SMPS Applications Engineering, 6 pages.

Adnaan Lokhandwala, et al., "SmartRectifier Control Simplifies Output Synchronous Rectification in DC-DC Series Resonant Converters," Proceedings of PCIM Europe 2006, International Rectifier SMPS Group, 6 pages.

Maurizio Salato, et al., "Design of Secondary Side Rectification Using IR1167 SmartRectifier™ Control IC," International Rectifier Application Note AN-1087, 2006, pp. 1-32.

* cited by examiner

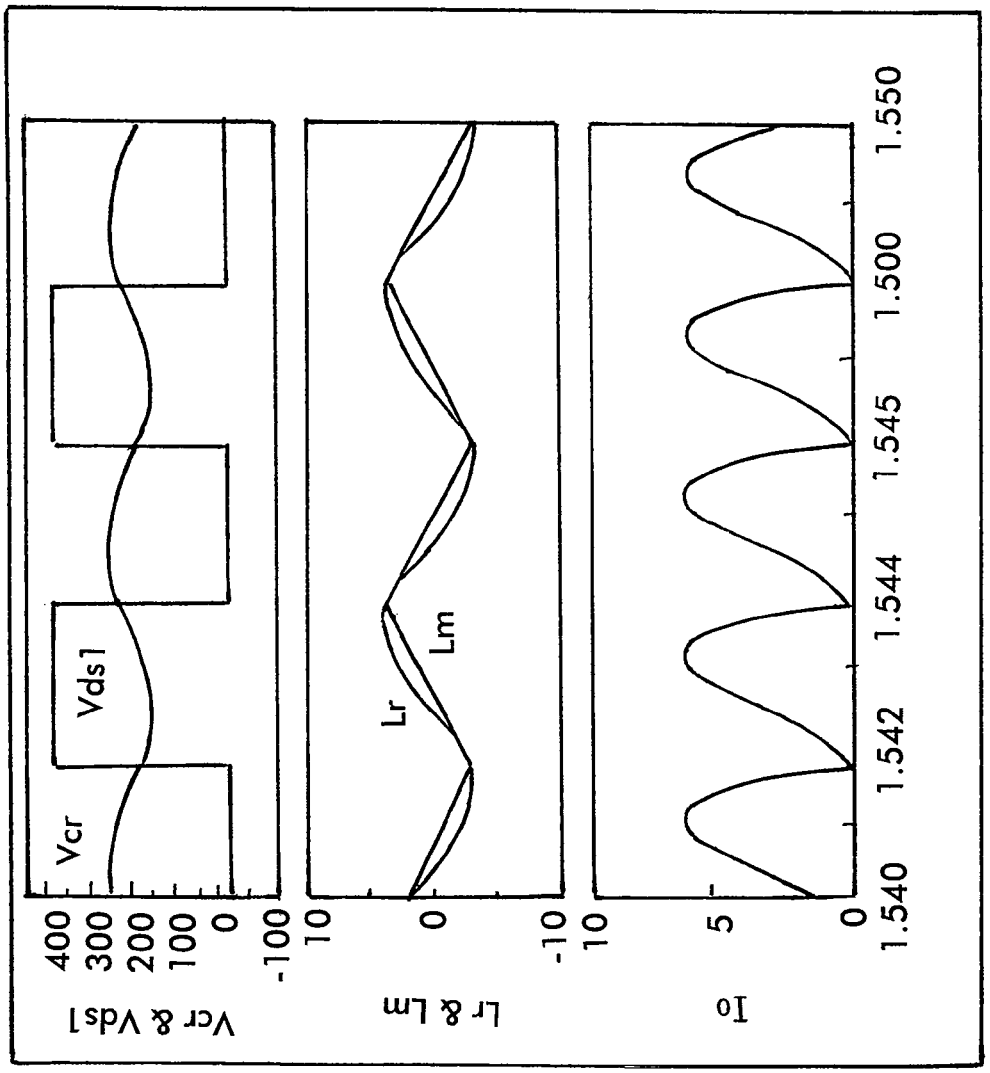
Mode B: $I_{OUT} = I_2$
FIG. 2A [continued-1]

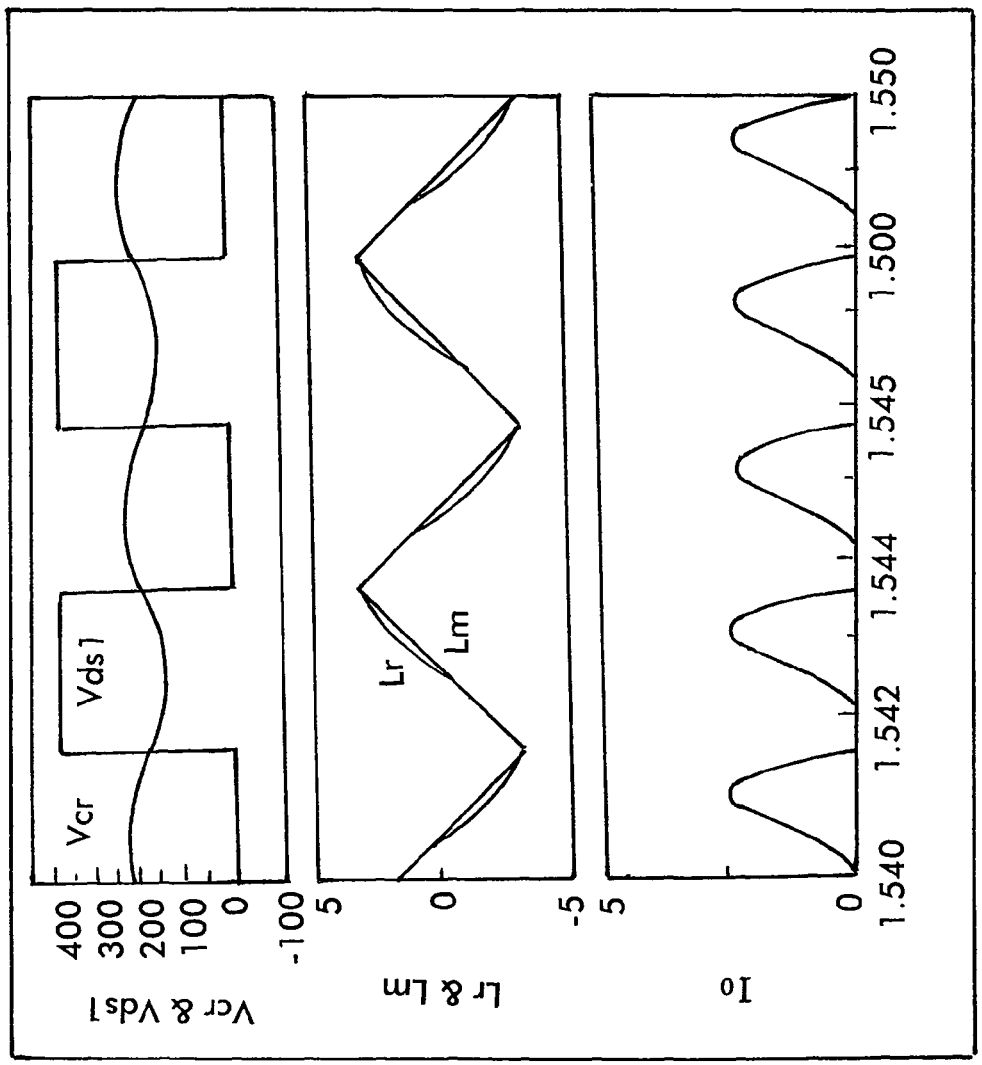
Mode C: $I_{OUT} = I_3$
FIG. 2A [continued-2]

SECONDARY SIDE SYNCHRONOUS RECTIFIER FOR RESONANT CONVERTER

CROSS-REFERENCE TO RELATED APPLICATION

This application is based on and claims priority to U.S. Provisional Patent Application Ser. No. 60/942,332, filed on Jun. 6, 2007 and entitled SMART RECTIFIER FOR RESONANT CONVERTER, and is a continuation-in-part of U.S. patent application Ser. No. 10/978,719, filed on Nov. 1, 2004 and entitled INTEGRATED SYNCHRONOUS RECTIFIER PACKAGE, which is based on and claims priority to U.S. Provisional Patent Application Ser. No. 60/517,333, filed on Nov. 4, 2003 and entitled INTEGRATED SMART RECTIFIER, the entire contents of which are hereby incorporated by reference.

BACKGROUND OF THE INVENTION

The present invention relates to secondary-side synchronous rectification in converters and more particularly to lessening conduction losses in rectifiers.

The incremental demand for size and weight reduction of portable and on board power modules has spurred significant development and research efforts in high-density, low profile power supplies. With ramping power density, thermal management becomes extremely critical and vital to the product quality and reliability. In the case of external adapters/chargers, designed for portable electronic equipment, that are housed in completely sealed enclosures for safety reasons, effective heat removal from the sealed box poses a major design challenge since the system cooling now primarily relies only on natural convection and radiation.

Resonant converters have become an attractive topology for front end DC bus conversion in medium and high power AC-DC power supplies. They offer significant advantages when compared to PWM converters, including soft-switching independent of load, reduced peak currents, higher power density, i.e., higher switching frequency making possible reduction in filter size, reduced electrical stress on power devices, and reduced EMI. Additionally, all these benefits are achieved without adding substantially to the overall system cost. The circuit parasitics can be used as energy storing elements of the resonant tank.

Among the different resonant topologies, LLC resonant converters have been the most attractive topology for front end DC bus conversion, as described in B. Yang, F. C. Lee, A. J. Zhang, G. Huang, "*LLC resonant converter for front end DC/DC Conversion*," IEEE-APEC 2002, pp. 1108-1112. They utilize the magnetizing inductance of the transformer to construct a complex resonant tank with buck boost transfer characteristics in the soft-switching region, as described in Bo Yang, "*Topology Investigation for Front End DC/DC Power Conversion for Distributed Power System*" Dissertation, Virginia Tech, Blacksburg, Va., September 2003. ("Reference 1").

Besides a few exceptions, described in Gerry Moschopoulos and Praveen Jain, "*A Series Resonant DC/DC Converter with Asymmetrical PWM and Synchronous Rectification*," IEEE Transactions on Power Electronics, Vol. 3, pp 174-182, April 198; and J. A. Cobos, J. Sebastian, J. Uceda, E. de La Cruz, and J. M. Gras "*Study of Applicability of Self-driven Synchronous Rectification to Resonant Topologies*" Power Electronics Specialists Conference, 1992, pp 933-940, ("Reference 2"), there have been very few research efforts for implementing output synchronous rectification in the resonant converters. Due to the complexity, cost, and unsatisfactory performance of the existing discrete/integrated solutions, output rectification in these converters has been widely implemented using diodes.

Additionally, to meet the stringent standby power constraints from various Energy Compliance Agencies, e.g., Energy Star, CEC, etc., these converters are required to operate in burst mode during light load conditions. Existing controller integrated circuits (ICs) for synchronous rectification are based on Phase-Locked Loop (PLL) control and rely on synchronizing signals from the primary-side to anticipate the secondary device turn-off transitions. Apart from the fact that these control techniques are not suitable for synchronous rectification in resonant converters, these controller ICs cannot operate during burst mode conditions. Further, as described in Reference 2, the complex operating modes of resonant converters do not allow self-driven gate-drive techniques or the use of primary gate signals to drive the secondary-side MOSFETs.

High conversion efficiency, capacitive output filter, and reduced stresses across the output rectifiers make a half-bridge LLC series resonant converter an attractive topology for high voltage DC bus conversion. Additionally, the buck-boost transfer characteristics of such converter simplify design constraints for meeting system hold up time requirements and allows design of wide input range DC-DC converters without compromising on the converter performance. That is, because the system hold-up time specifications require the down converter to be designed for a wide input range operation. For conventional PWM converters, they can only be optimized at a lowest input voltage where the duty cycle reaches its maximum value and the efficiency drops at a high line where the duty cycle is much smaller. Therefore, the wide range operation dramatically reduces the converter efficiency at the normal operating conditions and increases the thermal management requirements for the system.

FIG. 10 shows a prior art dual output voltage resonant converter employing primary side switches M1 and M2, transformer T having two secondaries and standard Schottky diodes providing secondary side non-synchronous diode rectification. As is known to those of skill in the art, the design is simple and requires no secondary side controller, but the forward conduction losses of the diodes are substantial, particularly when the output voltages are low.

FIG. 1a shows a single output voltage series resonant converter 1, wherein the diodes have been replaced by controlled MOSFETs $S_1$ and $S_2$. The invention will be applied to control the secondary side switches $S_1$ and $S_2$ via SR (Synchronous Rectifier) controller 15. The converter includes a half bridge switching stage having high- and low-side switches M1 and M2 series connected at a switching node S. Gates of the high- and low-side switches M1 and M2 are connected to and driven by a controller IC 5 via resistors R1 and R2. The high-side switch M1 is connected to a voltage supply $V_{IN}$ and the low-side switch M2 is grounded.

The converter 1 further includes a transformer 10 having a primary coil $L_P$ series connected between an inductor $L_r$, which is connected to the switching node S, and a grounded capacitor $C_r$ and parallel connected to an inductor $L_m$. Secondary coil portions $L_{S1}$ and $L_{S2}$ of the transformer 10 are series connected at a node P and to switches $S_1$ and $S_2$, respectively. Further, a parallel connected load RL and a capacitor $C_{out}$ are coupled between the node P and the ground.

FIG. 1b illustrates typical waveforms made by the resonant converter 1. These waveforms include signals LO and HO produced by the controller IC 5 to drive the high- and low-side primary side switches M1 and M2; the voltage $V_P$ across the primary coil $L_P$; the current $I_R$ through the inductor $L_r$, and the current $I_D$ from the secondary coil $L_S$ and through the switch $S_1$.

By varying the switching frequency of the high- and low-side switches M1 and M2, which operate at 50% duty cycle, the controller IC 5 regulates the output voltage of the resonant converter. Tight output voltage regulation can be achieved by varying the switching frequency of the converter. The output voltage is regulated with respect to the frequency of the resonant tank formed by the inductor Lr, capacitor Cr, and the magnetizing inductance of the primary coil Lp of the transformer 10. The voltage at the primary coil Lp of the transformer 10 has a 50% duty cycle under all operating conditions and is phase shifted with respect to the voltage at the input of the resonant tank. Hence, control driven rectification cannot be implemented to drive the secondary devices.

FIG. 1c illustrates AC transfer characteristics for the converter 1. The converter has two resonant frequencies, a lower resonant frequency, provided by the inductors $L_m$, and $L_r$, the capacitor $C_r$, and the load RL, and a higher fixed series resonant frequency $f_{R1}$ provided by the inductor $L_r$ and the capacitor $C_r$ only. Hence, the two switch devices M1 and M2 can be soft-switched by operating the converter either above or below the series resonant frequency $f_{R1}$.

Secondary-side synchronous rectification has widely replaced traditional diode based rectification implementations in a number of low voltage DC-DC converter applications. Due to design simplicity, two control schemes have been widely adopted for implementing output synchronous rectification. The first control scheme to derive the gate drive signals for the secondary side MOSFETs is control driven rectification using a secondary controller/driver IC with synchronizing signals from the primary gate-drive. However, deriving the optimum secondary gate-drive signals still presents a significant challenge in a number of Switched-Mode Power Supply (SMPS) topologies. The other control scheme is self-driven rectification using signals directly from the output of the power transformer. Here, an output of the power transformer is used to drive the secondary devices.

FIG. 2a illustrates different operating modes of the series resonant converter 1 of FIG. 1a. The different operating modes or load conditions depend on the level of the load current $I_{OUT}$. The top graph in each mode illustrates the midpoint of the half bridge and voltage across the resonant capacitors. The middle graph illustrates current through the resonant inductor and magnetizing inductance. The bottom graph illustrates the output current $I_O$. Where mode A $I_{OUT}=I_1$ is a nominal operation condition known as the Continuous Conduction Mode (CCM) because the output current is always continuous, where the primary coil Lp is clamped by the output voltage and never operates in the resonant process. As the load current is decreased, the converter changes to operation in Mode B, $I_{OUT}=I_2$ and the resonant tank consists of the capacitor Cr and primary coil Lp+the inductor Lr. There is a small time period when the secondary current $I_O$ is zero (the primary current is clamped to the magnetizing current) after the primary devices switch. As the load is decreased further, the converter changes to operation in Mode C, $I_{OUT}=I_3$, where $I_3<I_2<I_1$, where the tank current is now clamped to the magnetizing current even before the primary switching devices M1 and M2 switch.

In the case of resonant converters, the output synchronous rectifiers $S_1$ and $S_2$ cannot be driven by using synchronizing signals from the primary-side due to the phase shift between the resonant tank voltage and current as observed in FIG. 2b. The top graph of FIG. 2b shows the phase of the primary-side gate signal waveforms and the bottom graph shows the phase of the secondary rectifier voltage and current waveforms lagging behind. The relative phase shift varies depending on the operating point of the converter with respect to the resonant frequency of the LLC tank.

Self-driven synchronous rectification for various resonant converter topologies has been investigated, as discussed in Reference 2. For the LLC resonant converter, the current through the output rectifiers behaves differently depending on the operating point of the converter with respect to $f_{R1}$, as described in Reference 1. When the converter operates at light load conditions in the region above $f_{R1}$, the output current IO is discontinuous i.e. the secondary winding voltage and currents are not in phase as shown in FIG. 2c. Waveforms during operation at light load ($f>f_{R1}$)—voltage across the switch S2 and current through the switch $S_1$ illustrated at the top of the drawing and discontinuous output current IO illustrated at the bottom.

Hence, self driven rectification cannot be implemented for converters operating in this region above $f_{R1}$ as the timing mismatch would cause $C_{out}$ to discharge across the ON rectifier. This results in a reactive power flow between the output and the power transformer is shown in FIG. 3. Reactive power flows between the output and power transformer. The graph (a) shows the resonant tank current; the graph (b) shows the secondary rectifier current through the secondary switch; and the graphs (c) and (d) gate-source and drain-source switch voltages $V_{GS}$ and $V_{DS}$. Hence, as illustrated, self driven rectification cannot be implemented here due to the discontinuity in the secondary current $I_O$, i.e., the output capacitor $C_{out}$ will discharge across the ON secondary switch when that device's current is zero.

Similar load dependent properties of other resonant converter topologies add complexity in implementing synchronous rectification at the output. When the converter operates in the soft switching range below $f_{R1}$, the magnetizing inductance participates in the resonant cycle and results in discontinuities in the output current. This is shown in FIG. 4, where waveforms for operation at $f<f_{R1}$, voltage and current across the primary of the power transformer and output current $I_O$. Hence, self driven rectification cannot be implemented when operating in this region as well.

As discussed above, no dedicated IC is provided that is targeted towards synchronous rectification in resonant converter applications. On the other hand, implementing synchronous rectification in these topologies with discrete control is cumbersome and requires at least two current sense transformers, two high speed, high voltage comparators, and a high current, low propagation delay gate-driver to drive the two rectifiers. Additionally, large printed circuit board (PCB) area will be required for this approach, and the discrete component tolerances and variations across temperature range strongly affect timing performance, which is extremely critical here.

What is needed is a control that operates completely independent of the primary side control. It should be based on differentially sensing the drain-source voltage of the MOSFET device to determine the level of current through the MOSFET device and turn the MOSFET device ON and OFF in close proximity of the zero current transition; hence, the control should always ensures zero-voltage turn on transitions. The sensed voltage should be compared with two negative thresholds to decide the turn-ON and turn-OFF transitions for the synchronous rectifiers.

SUMMARY OF THE INVENTION

It is an object of the present invention to replace diode rectifiers with synchronous rectification in resonant DC-DC converters in a manner that is independent of the topology and operating modes of the converter.

It is another object of the present invention to reduce conduction and leakage losses in resonant converters, which is a substantial contributor to the overall system losses.

Provided is a resonant converter comprising a switching stage having high- and low-side switches series connected at a switching node and controlled by a primary side controller. The converter includes a transformer having a primary coil and a secondary coil having at least one pair of portions series connected at a node; a resonant tank formed by series connecting the primary coil to the switching node with a first inductor and a first capacitor; at least one pair of first and second secondary side switches connected to the at least one pair of portions, respectively, the first and second switches of each pair being used for synchronous rectification; and a secondary side controller to control the first and second secondary side switches of each pair by sensing voltage across each secondary side switch and determining a turn ON and turn OFF transition for first and second secondary side switches in close proximity to a point in time where there is zero current through the secondary side switch to achieve synchronous rectification.

Other features and advantages of the present invention will become apparent from the following description of the invention that refers to the accompanying drawings.

DETAILED DESCRIPTION OF EMBODIMENTS OF THE INVENTION

The present invention provides a solution for replacing diode rectifiers with synchronous rectification in resonant DC-DC converters independent of the topology and operating modes of the converter. This in turn dramatically reduces conduction and leakage losses.

To emulate the diode rectification function it is necessary to determine the direction of flow of current in the switch and turn off the switch promptly when the current direction reverses. To perform these functions, the current in the switch is sensed using the switch's on-state resistance. The invention switches the two synchronous MOSFETs $S_1$ and $S_2$ (FIG. 1a) ON and OFF depending on their sensed drain to source voltages (i.e., $V_{DS1}$ and $V_{DS2}$). This basic design is described in U.S. patent application Ser. No. 10/978,719 entitled "Integrated Synchronous Rectifier Package," for a half-wave synchronous rectifier (IR-2636).

Figure 1A:
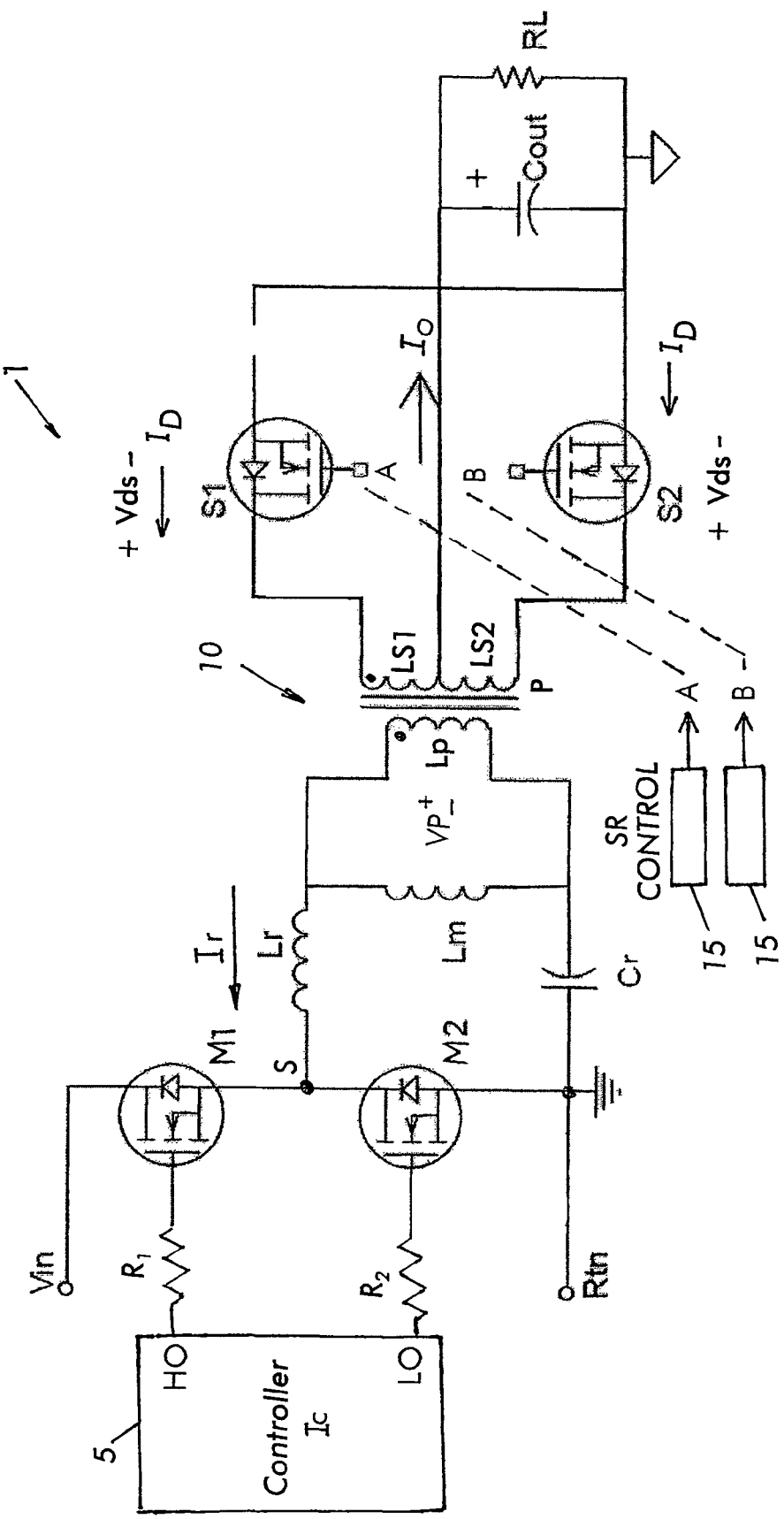
FIG. 1a is a diagram of a series LLC resonant converter having a half bridge switching stage of series connected high- and low-side switches.
Figures 5, 5A:
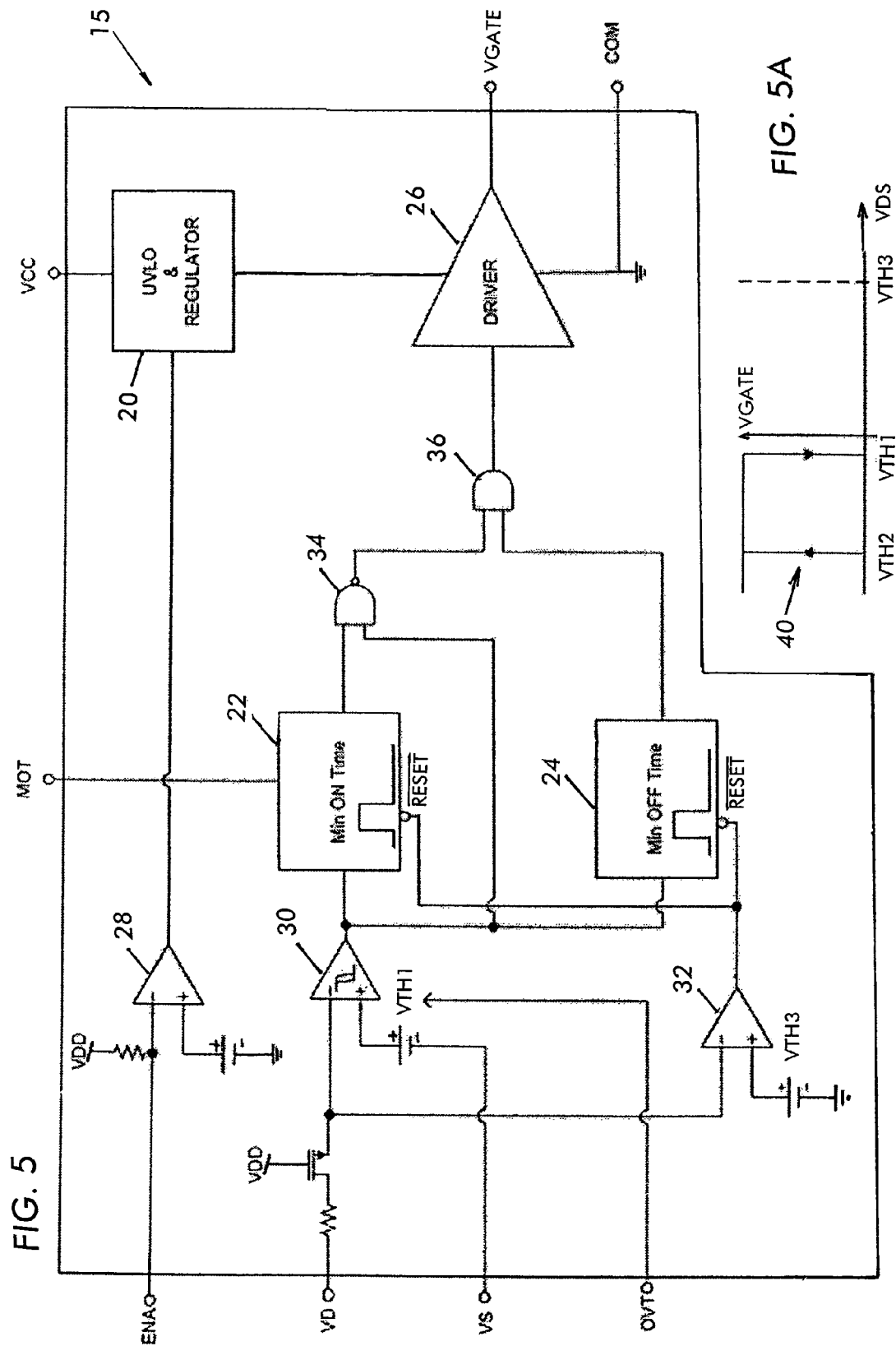
FIG. 5 is a block diagram of an IC designed to control and drive power MOSFETs used as synchronous rectifiers in isolated converters, for example N-Channel MOSFETs in accordance with the present invention.
FIG. 5a shows the switching signal at the switch gate, showing the threshold signals.

FIG. 5 illustrates an internal block diagram of an eight pin IC 15 designed to control and drive power switches, for example N-Channel MOSFETs, used as synchronous rectifiers in isolated converters, e.g., as shown in FIG. 1a. The IC 15 can control one or more paralleled MOSFETs to emulate the behavior of Schottky diode rectifiers. The IC 15 includes supply voltage pin VCC; offset voltage trimming pin OVT; minimum ON time pin MOT; enable pin EN for putting the IC in a sleep mode, this helps in meeting the stringent standards on power consumption during stand-by operation; switch drain sensing pin $V_D$; switch source sensing pin VS; ground pin GND; and gate drive output pin VGATE. The IC 15 further includes a UVLO & REGULATOR circuit 20 that receives the supply voltage from pin VCC and a processed enable signal from pin EN. The enable signal is processed in a comparator circuit 28, where it is compared with a threshold voltage.

The IC 15 further includes minimum ON time and OFF time circuits 22 and 24 and a gate driver circuit 26 for outputting a gate drive output signal from pin VGATE. Both the minimum ON time and minimum OFF time circuits 22 and 24 receive a first input signal provided by a comparator circuit 30 and a reset not signal provided by a comparator circuit 32.

Figure 1B:
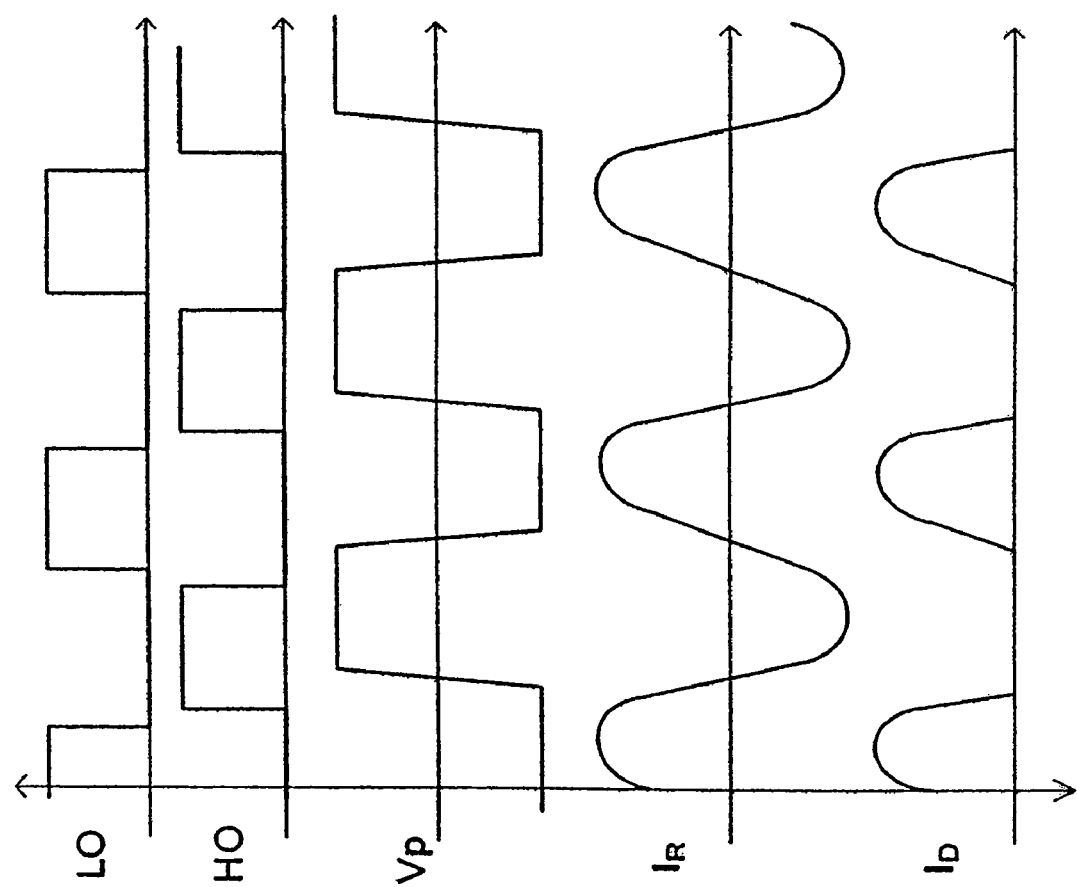
FIG. 1b is a graph of typical waveforms of the series resonant converter of FIG. 1.
Figure 1C:
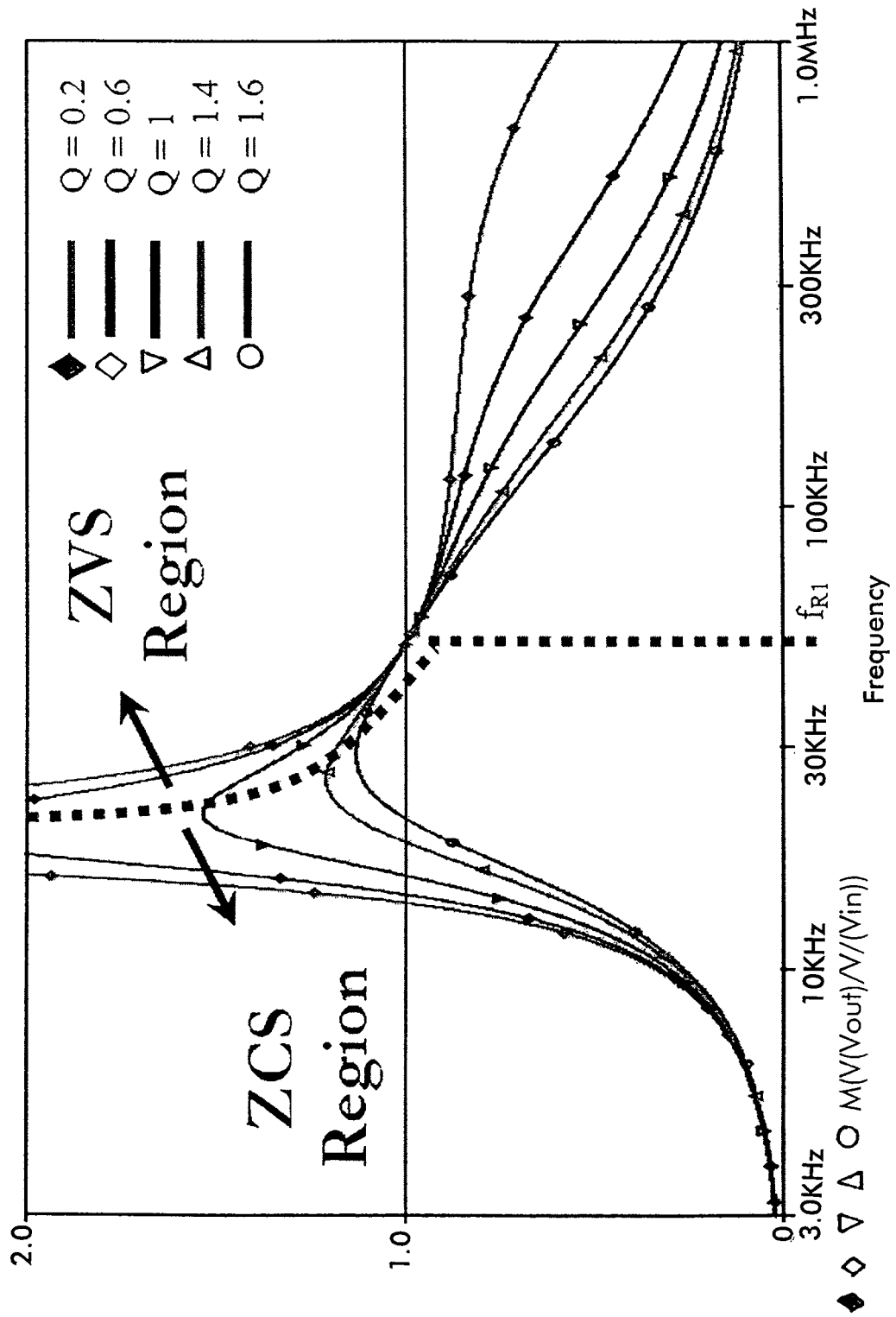
FIG. 1c is a graph of AC transfer characteristics of the series resonant converter of FIG. 1.
Figure 2A:
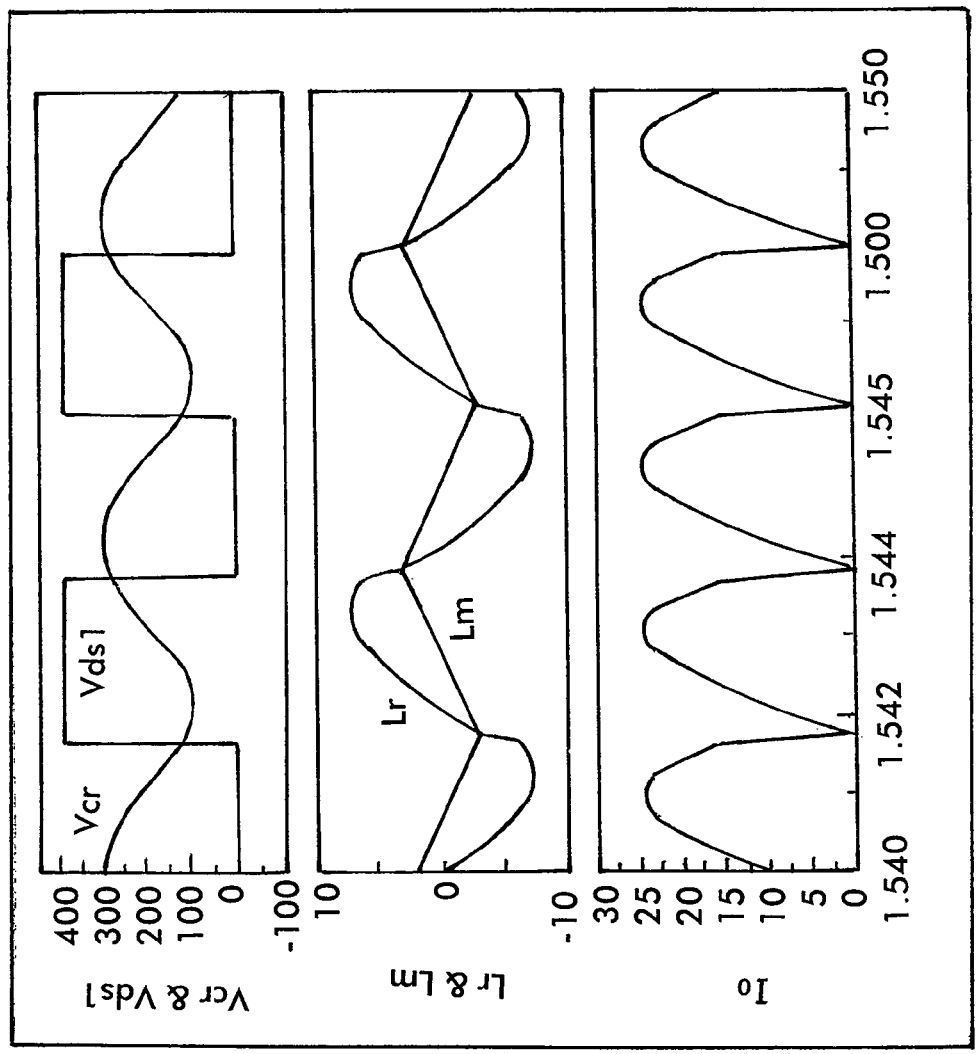
FIG. 2a illustrates different operating modes of the series resonant converter 1.
Figure 2B:
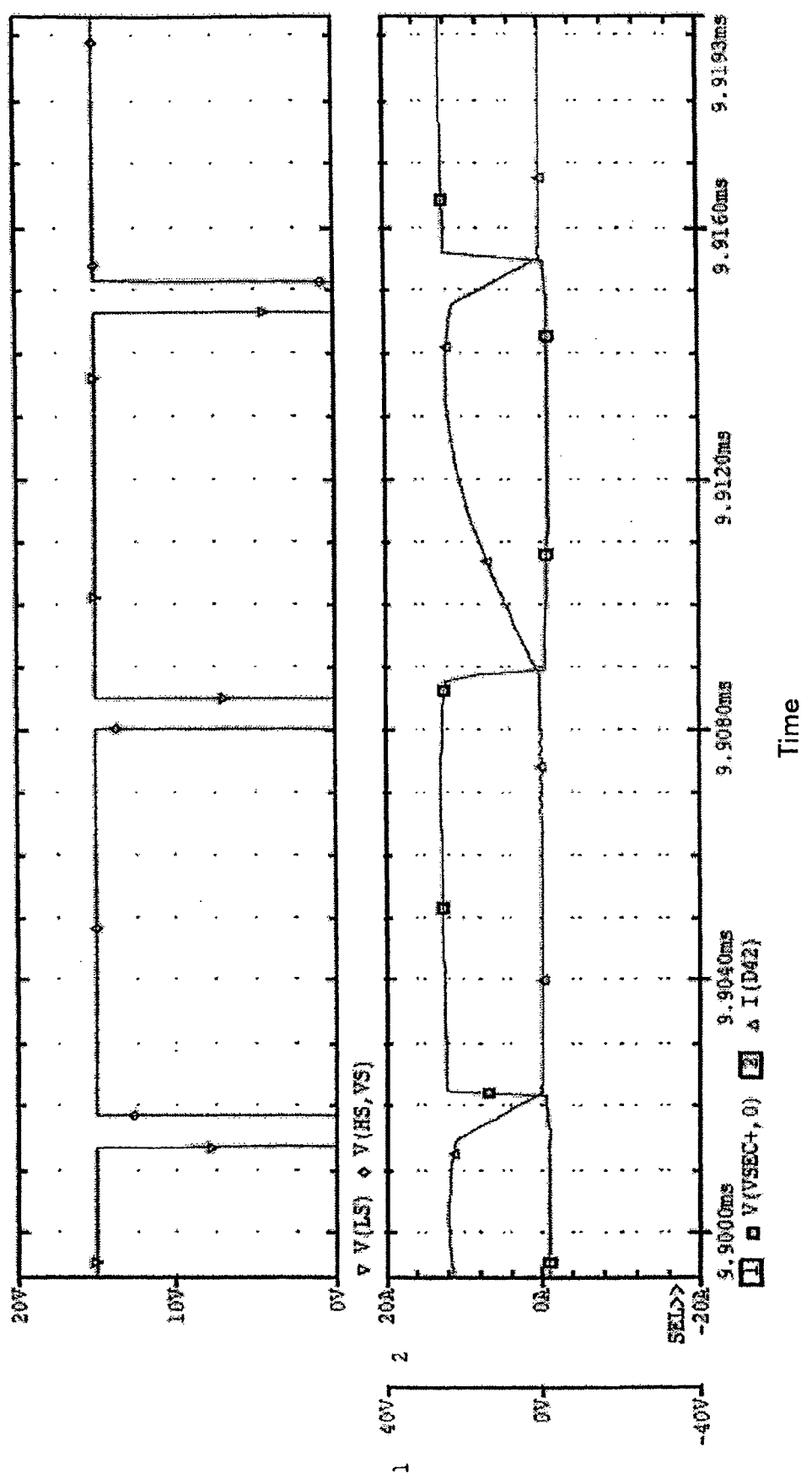
FIG. 2b is a graph showing the phase shift between the resonant tank voltage and current that prevents using synchronizing signals from the primary-side driving output synchronous rectifiers.
Figure 2C:
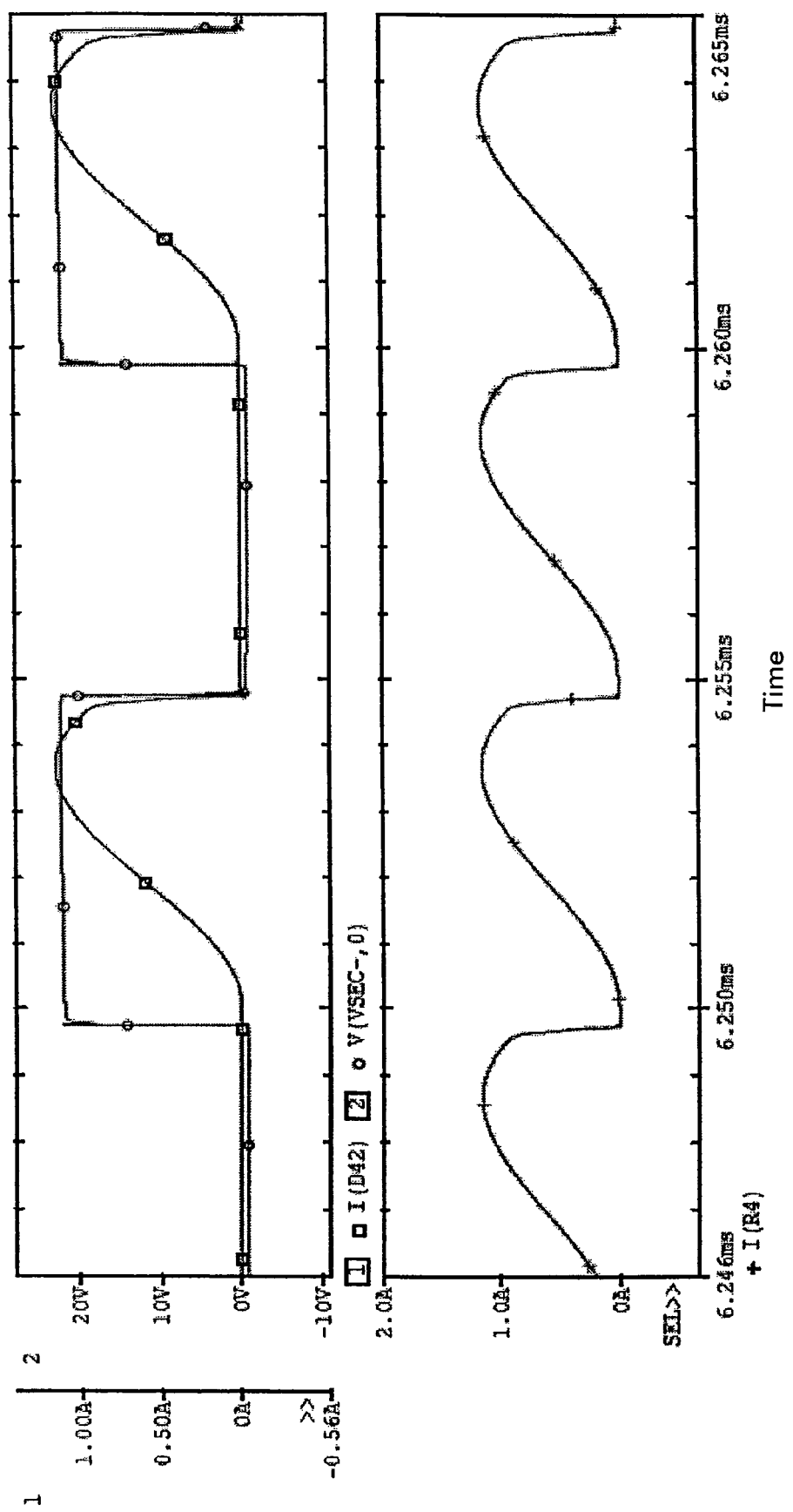
FIG. 2c is a graph showing the converter operating at light load conditions in the region above $f_{R1}$ having discontinuous output current $I_O$.
Figure 3:
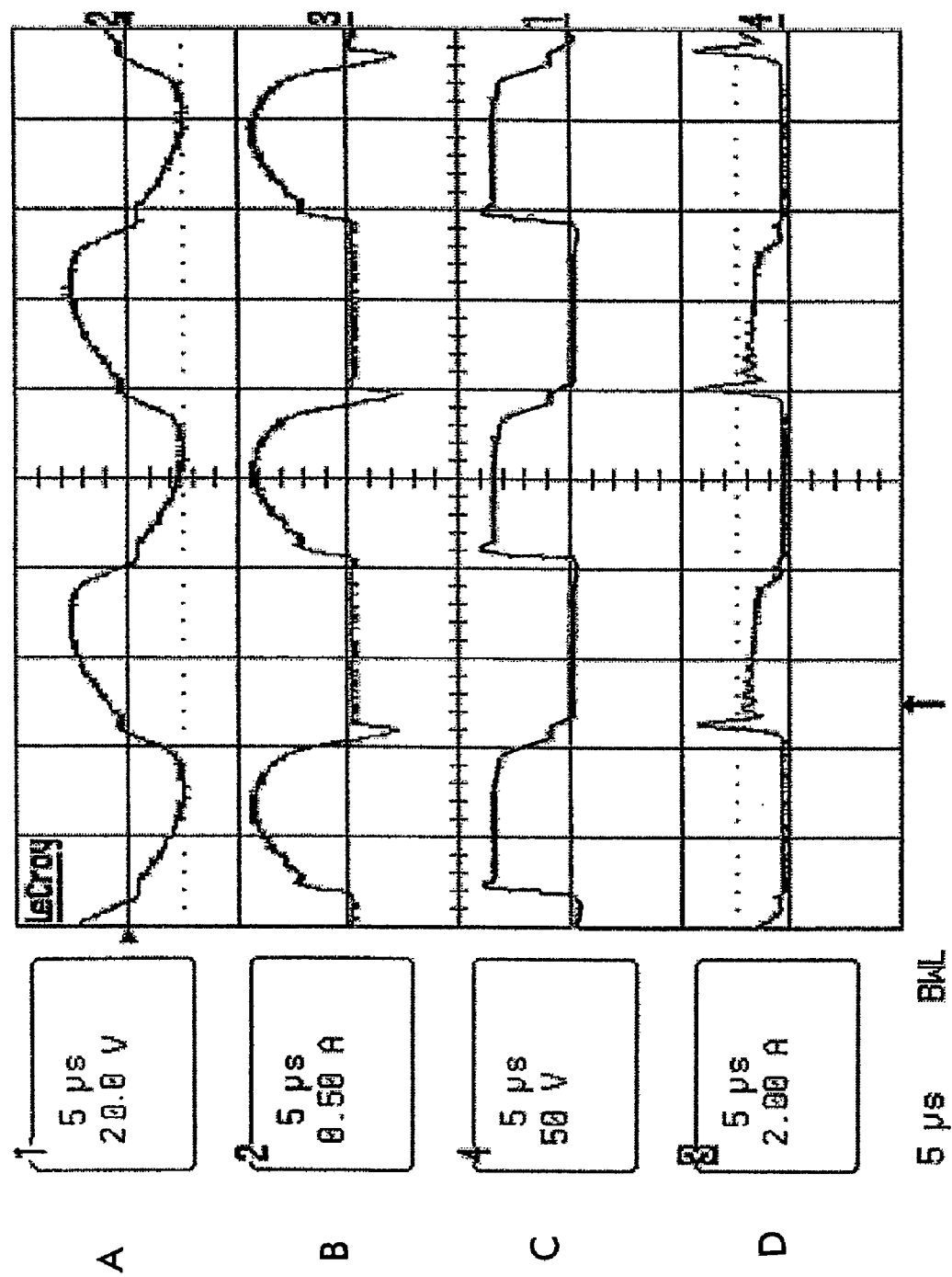
FIG. 3 is a graph showing a reactive power flow between the output and the power transformer.
Figure 4:
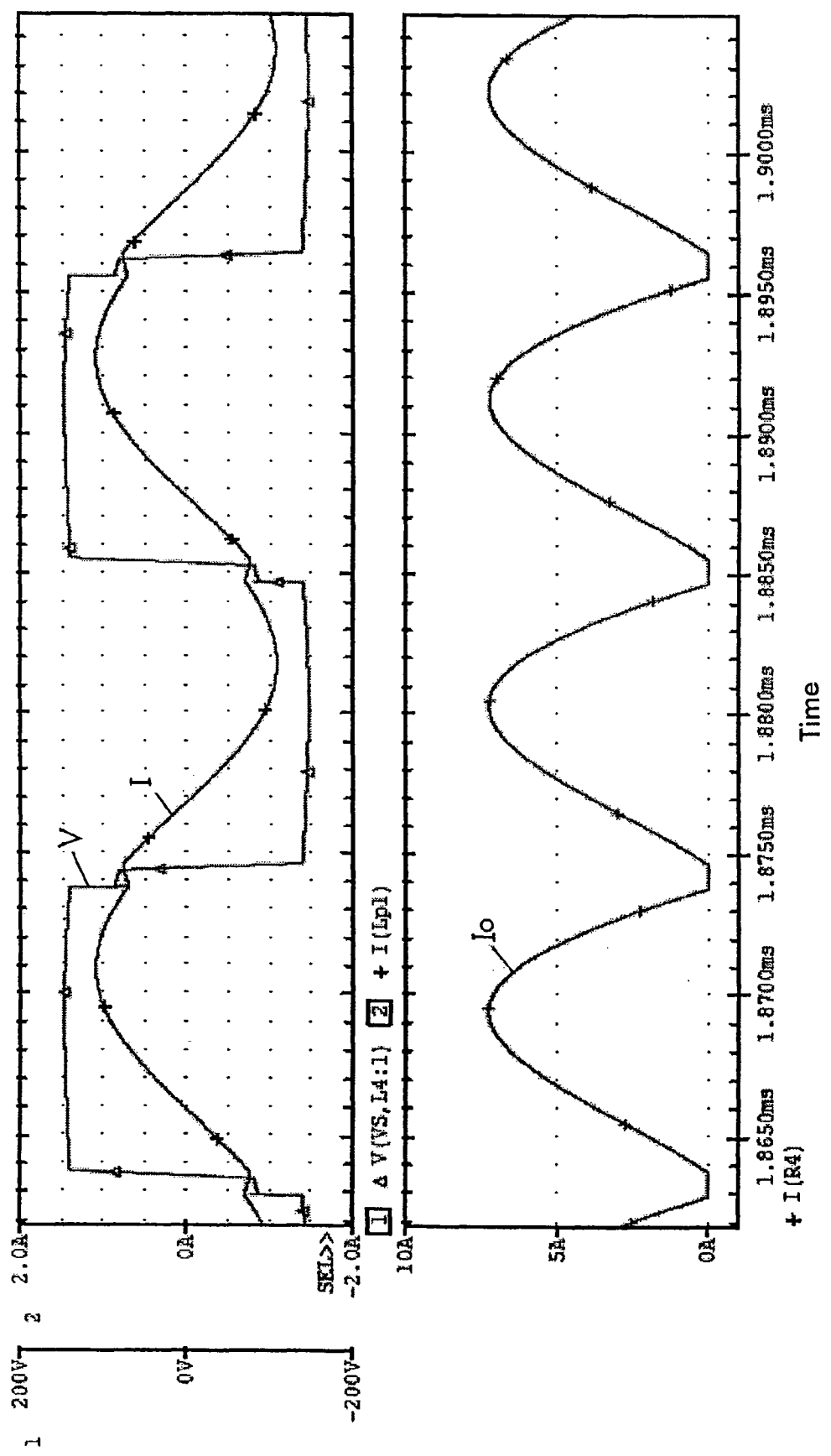
FIG. 4 is a graph showing discontinuities in the output current resulting from the magnetizing inductance participating in the resonant cycle when the converter operates in the soft switching range below $f_{R1}$.

The hysteretic comparator circuit 30 compares a sensed switch drain voltage $V_D$ at pin $V_D$ and a sensed switch source voltage $V_S$ at pin VS and uses a first threshold value $V_{TH1}$ to sense the voltage across the switch. As shown by the waveform of FIG. 5a, the gate voltage is switched off when $V_{DS}$ exceeds $V_{TH1}$ ($S_1$ or $S_2$ of FIG. 1a off) and switches on when $V_{DS}$ goes below $V_{TH2}$ ($S_1$ or $S_2$ on). When $V_{DS}$ equals $V_{TH3}$, the minimum off time circuit is reset, since it is clear that the AC waveform is in the non-conducting half cycle because the $V_{DS}$ is above $V_{TH3}$. The comparator circuit 32 compares a sensed switch drain voltage $V_D$ at pin $V_D$ and a third threshold value $V_{TH3}$. The two comparators 30 and 32 determine the polarity and the level of the drain to source current of the MOSFET switches $S_1$ and $S_2$ (FIG. 1) and are selected to be high speed and high-voltage (200V).

The output of the minimum ON time circuits 22 is ANDed with the first input signal provided by the comparator 30 in an AND circuit 34. Finally, the inverse of output of the AND circuit 34 is ANDed with the output signal of the minimum OFF time circuits 24 in an AND circuit 36. The output of the AND circuit 36 is delivered to the gate driver circuit 26 for outputting the resultant gate drive output signal from pin VGATE (FIG. 5a).

A dedicated internal logic circuit then manages to turn the power switch ON and OFF in close proximity of the zero current transition. This ensures proper operation without the need of PLL or external timing sources. The control technique of the inventive IC 15 is based on sensing the voltage across the MOSFETs $S_1$ and $S_2$ and comparing it with two negative voltage threshold values $V_{TH2}$ and $V_{TH1}$ to determine the turn ON and OFF transition for the IC 15. See FIG. 5a. $V_{TH1}$ is programmable and $V_{TH2}$ is determined by the hysteretic comparator 30. The rectifier current is sensed by the input comparators using the power MOSFET RDS-ON as a shunt resistance and its output signal at pin VGATE is driven depending on the level of the voltage $V_{DS}$ sensed at pins $V_D$ and $V_S$. The three voltage threshold values are shown in FIG. 5a.

Figure 6:
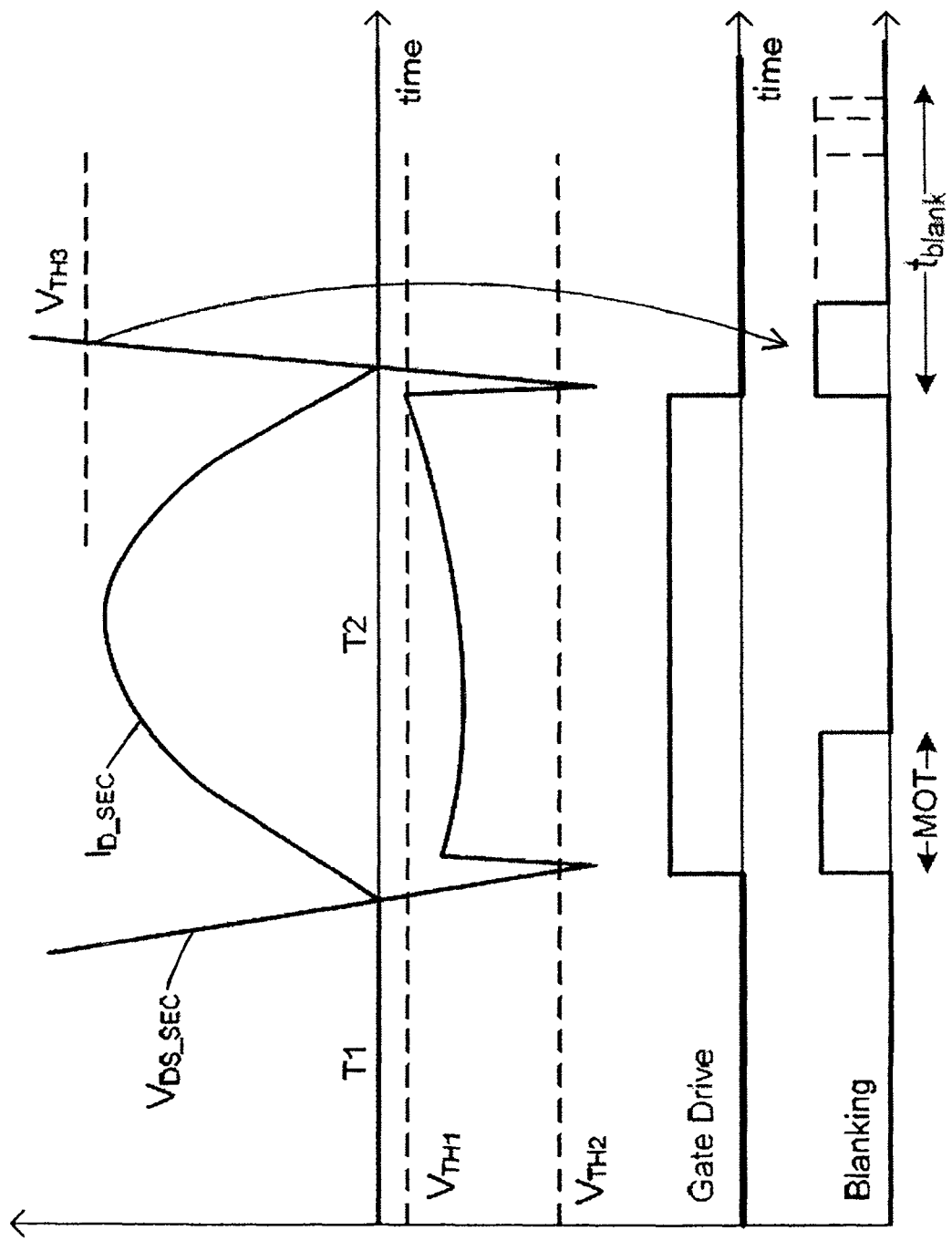
FIG. 6 illustrates typical waveforms for a series resonant converter with the control IC of FIG. 5.

FIG. 6 illustrates typical waveforms for series resonant converter 1 (FIG. 1a) with two controller ICs 15 (FIG. 5), each driving a switch $S_1$ and $S_2$. A more negative voltage threshold $V_{TH2}$ detects current through the body diode of the switches $S_1$ and S2 and hence controls the turn on transition of the switches. Similarly, a second, externally programmable smaller negative threshold, $V_{TH1}$, determines the level of the current at which the switches turn OFF. A minimum on time MOT externally programs the width of the minimum gate pulse when $V_{TH2}$ is triggered and prevents false turn off and gate chattering when the switch current transits between the MOSFET body diode and its channel.

In variable frequency resonant converter applications, the converter 1 (FIG. 1a) operates at the minimum switching frequency at low line-full load conditions and at the maximum frequency at high line-no load conditions. Hence, for such applications setting pin MOT can simply be based on the maximum switching frequency of the converter. Pin MOT ensures proper gating signals for the synchronous MOSFETs during light load conditions, i.e., operating at higher switching frequency. The situation only improves when the converter operates at heavier loads. The design of the converter 1 is further simplified by the wide range of the voltage supply $V_{CC}$ (11-20V) for the IC 15. The voltage supply $V_{CC}$ can be directly derived from the output of the converter 1.

Additionally, the IC 15 is equipped with advanced power management features, which allow the synchronous MOSFET switches $S_1$ and $S_2$ to be turned ON and OFF in very close diode emulation. This is due to the use of the same device as sensing element. This way, the highest possible performance for a given switch $S_1$ and $S_2$ is obtained, often enabling smaller switch sizes. Also, the gate turn OFF is very close to current zero crossing, which eliminates reactive power flow between the output capacitors and power transformer.

Figure 7:
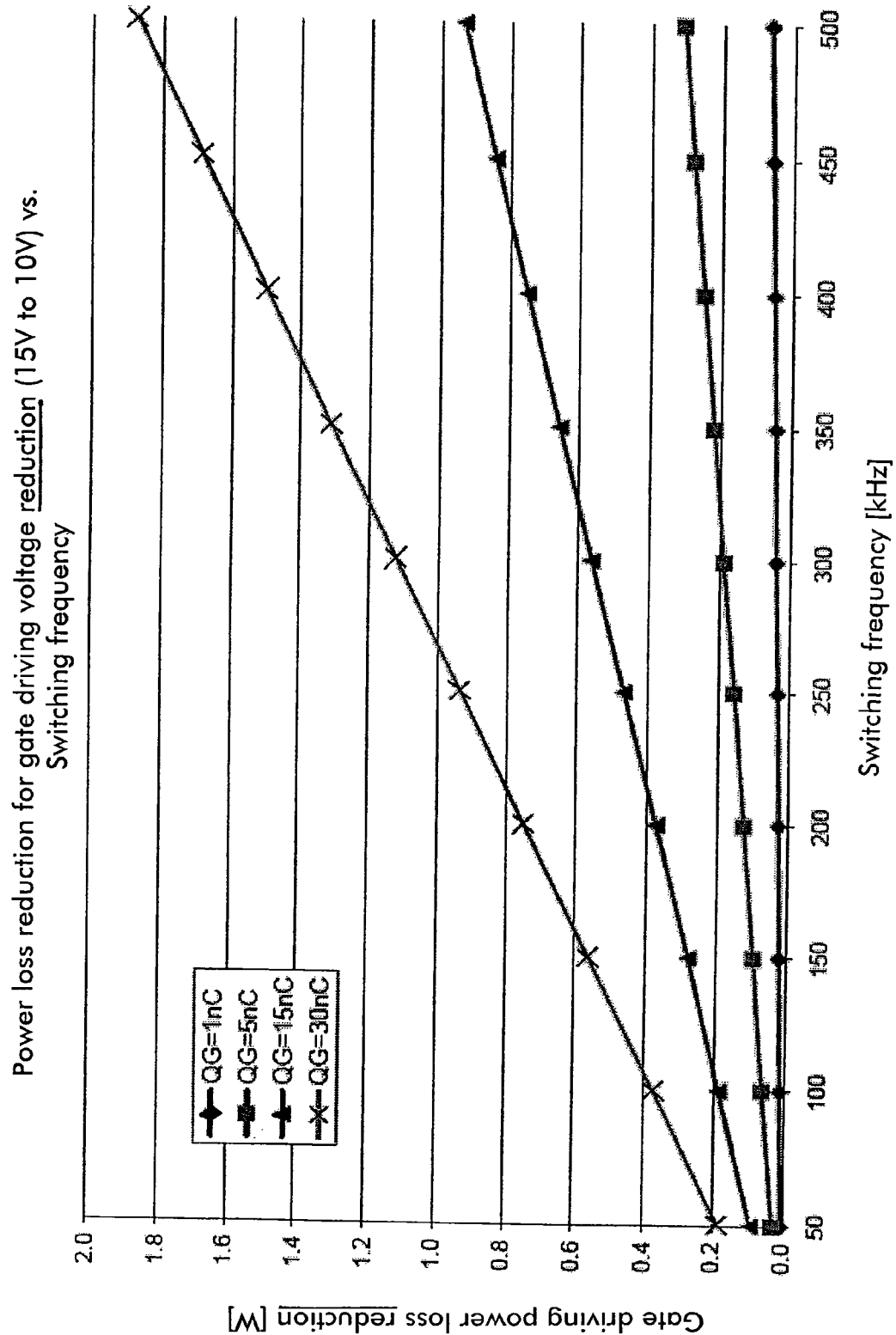
FIG. 7 is a graph showing a reduction in power losses for 4 different loads in a 50-500 kHz switching frequency range.

The IC 15 includes an integrated gate voltage clamp at 10.7V, which greatly reduces the controller power consumption as compared to discrete based designs. With ramping converter switching frequencies and larger gate charges (more devices in parallel) significant amount of power is wasted in just gate operations. FIG. 7 shows the reduction in power losses for four different loads in a 50-500 kHz switching frequency range, power loss reduction for gate driving voltage reduction 15V to 10V vs. switching frequency.

Figure 8A:
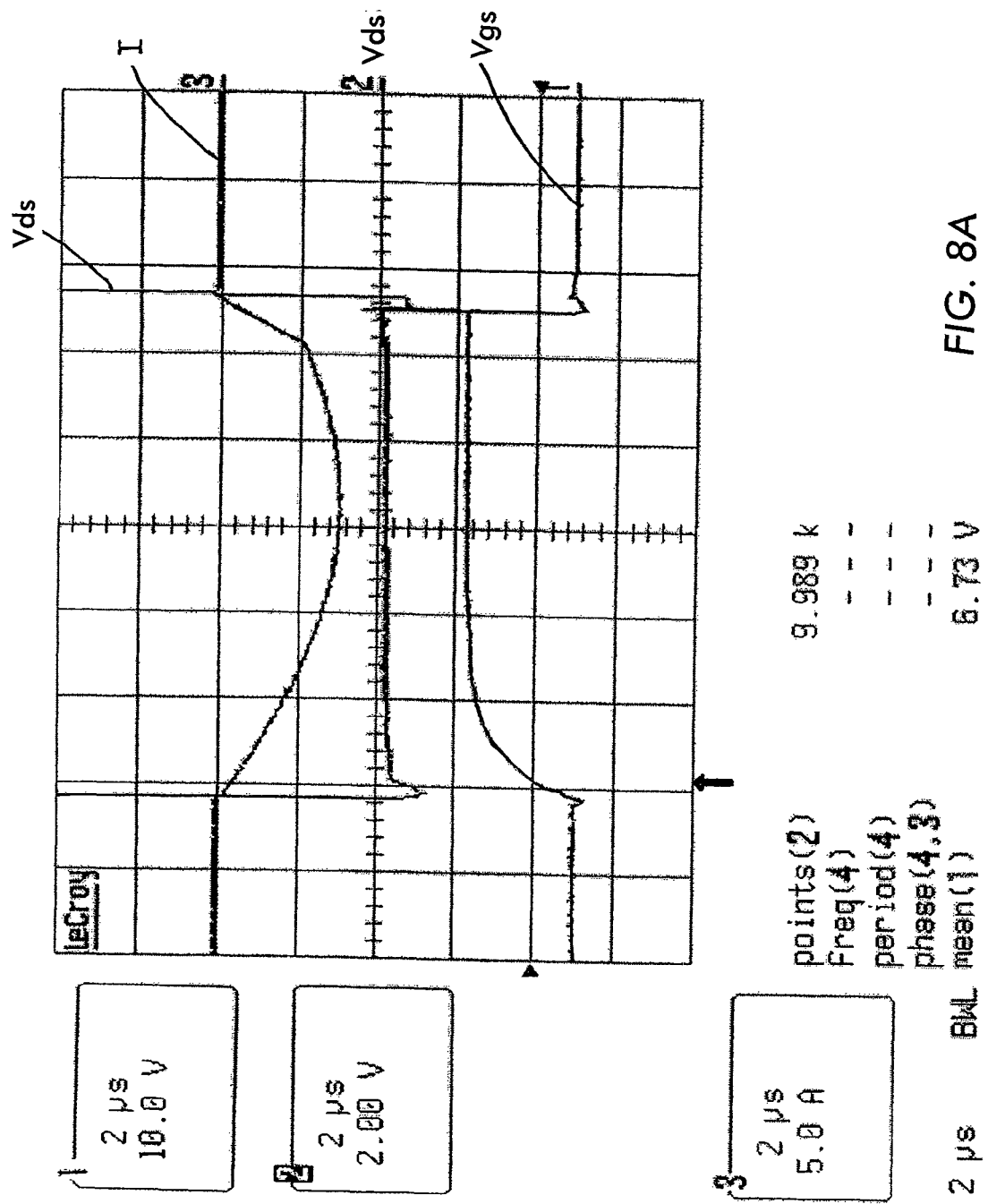
FIG. 8a is a graph showing waveforms for control of one of the two secondary rectifiers.

An example of the IC 15 is demonstrated on a 130 W/16V series resonant converter 40V MOSFETs, e.g., IRF2804 produced by the International Rectifier Corporation, are used for synchronous rectification at the output and two ICs 15, e.g., IR1167 from the International Rectifier Corporation, are used to control these devices. FIG. 8a illustrates the control waveforms for one of the two secondary rectifiers. The top graph (3) is the synchronous rectifier current I, the middle graph (2) is the drain-source voltage $V_{DS}$, and the bottom graph (1) is the gate-source voltage $V_{GS}$. It can be observed that the switch turns OFF precisely at a very small level of current and hence, reduces the conduction time for the body diode of the power MOSFET.

Figure 8B:
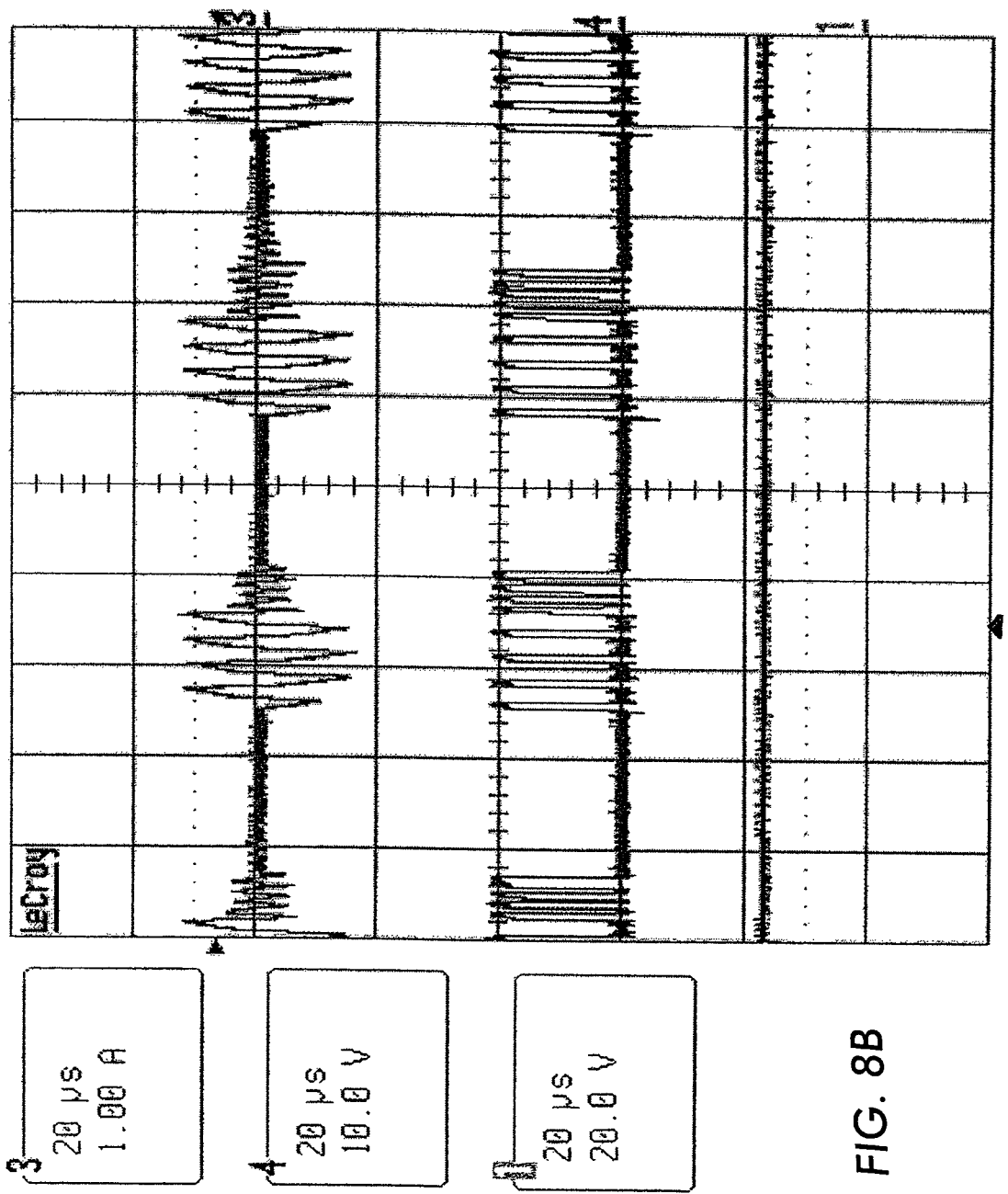
FIG. 8b is a graph showing waveforms of the control IC operating in burst mode during light load conditions.

The minimum and maximum switching frequency range required for output voltage regulation over line and load depends on the Q factor of the resonant tank. To limit the frequency range, resonant converters are required to operate in active burst mode, i.e., the converter switching action turns on and off at light load conditions and reverts back to normal operation when the load kicks in. FIG. 8b shows the system waveforms while operating in burst mode during light load conditions. The top graph (3) is the resonant tank current, the middle graph (4) is the synchronous rectifier gate-source voltage, and the bottom graph (1) is the regulated output voltage.

Figure 9:
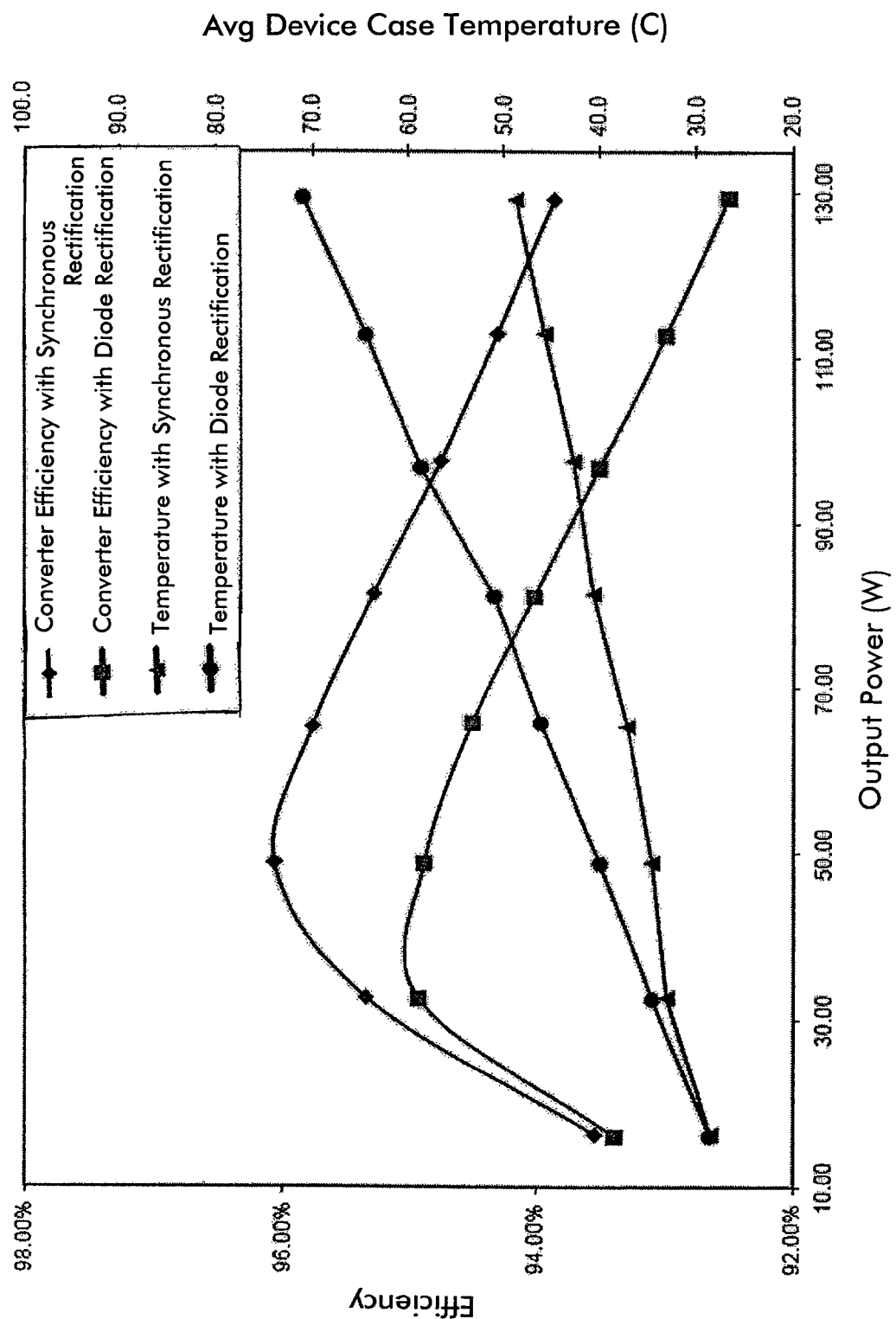
FIG. 9 is a graph showing improvements in efficiency and thermal performance achieved by synchronous over diode rectification.

FIG. 9 shows improvements in efficiency and thermal performance achieved by moving from diode rectification to synchronous rectification in the resonant converter. The system performance is compared with diode rectification by replacing the two synchronous MOSFETs with 45V Schottky diodes, e.g., MBR4045 manufactured by Motorola, that are mounted on the same heat sink.

Figure 11A:
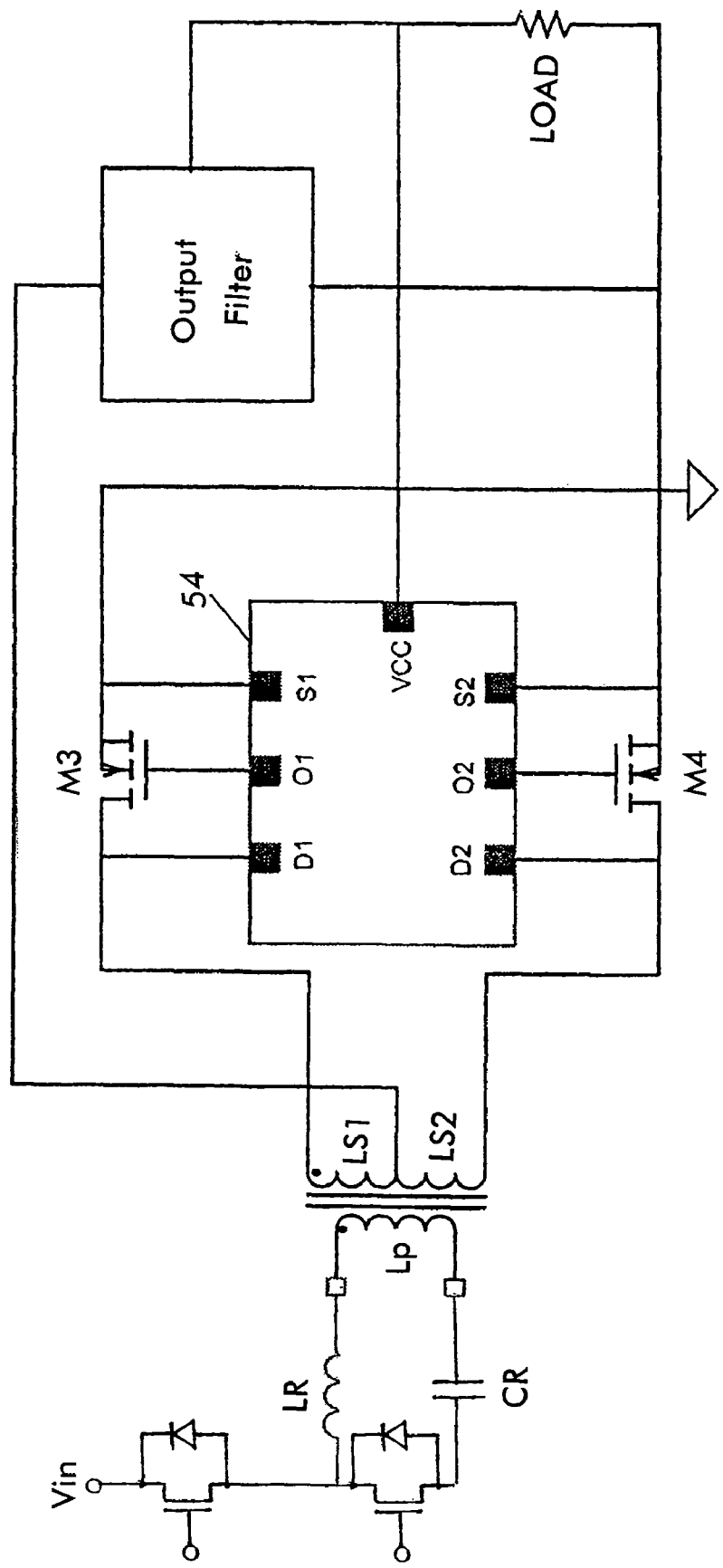
FIG. 11A is a diagram of a full wave synchronous rectification circuit using a Dual Rectifier control IC according to the invention.
Figure 12:
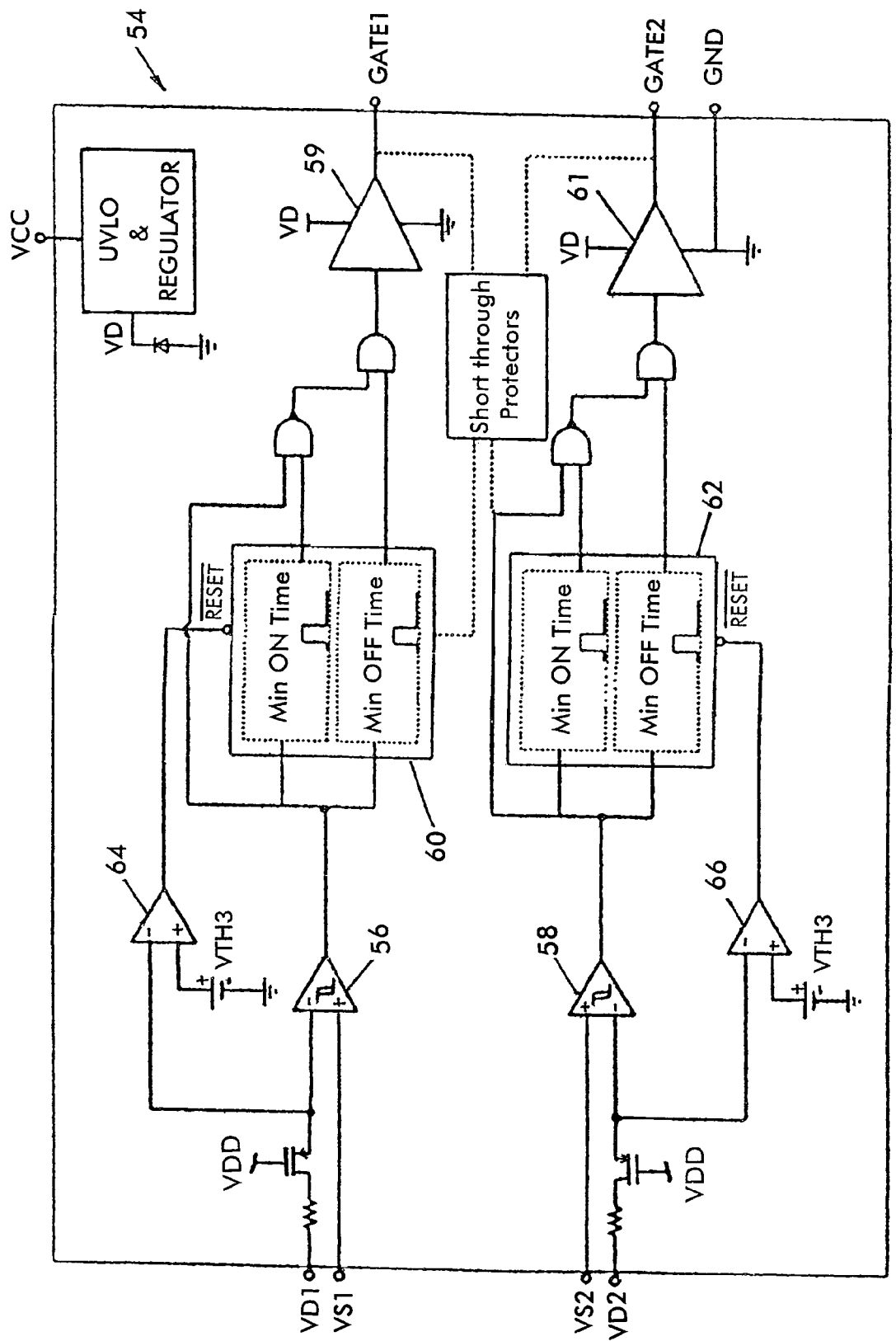
FIG. 12 is a diagram of an internal block of the Dual Rectifier controller IC of FIGS. 11A and 11B and its pin-out.

FIG. 11A shows a Dual Rectifier controller IC 54 that comprises two of the control circuits 15 of FIG. 5 in one package to provide full wave synchronous secondary rectification. The internal structure of the Dual Rectifier controller IC 54 is shown in FIG. 12.

Figure 10:
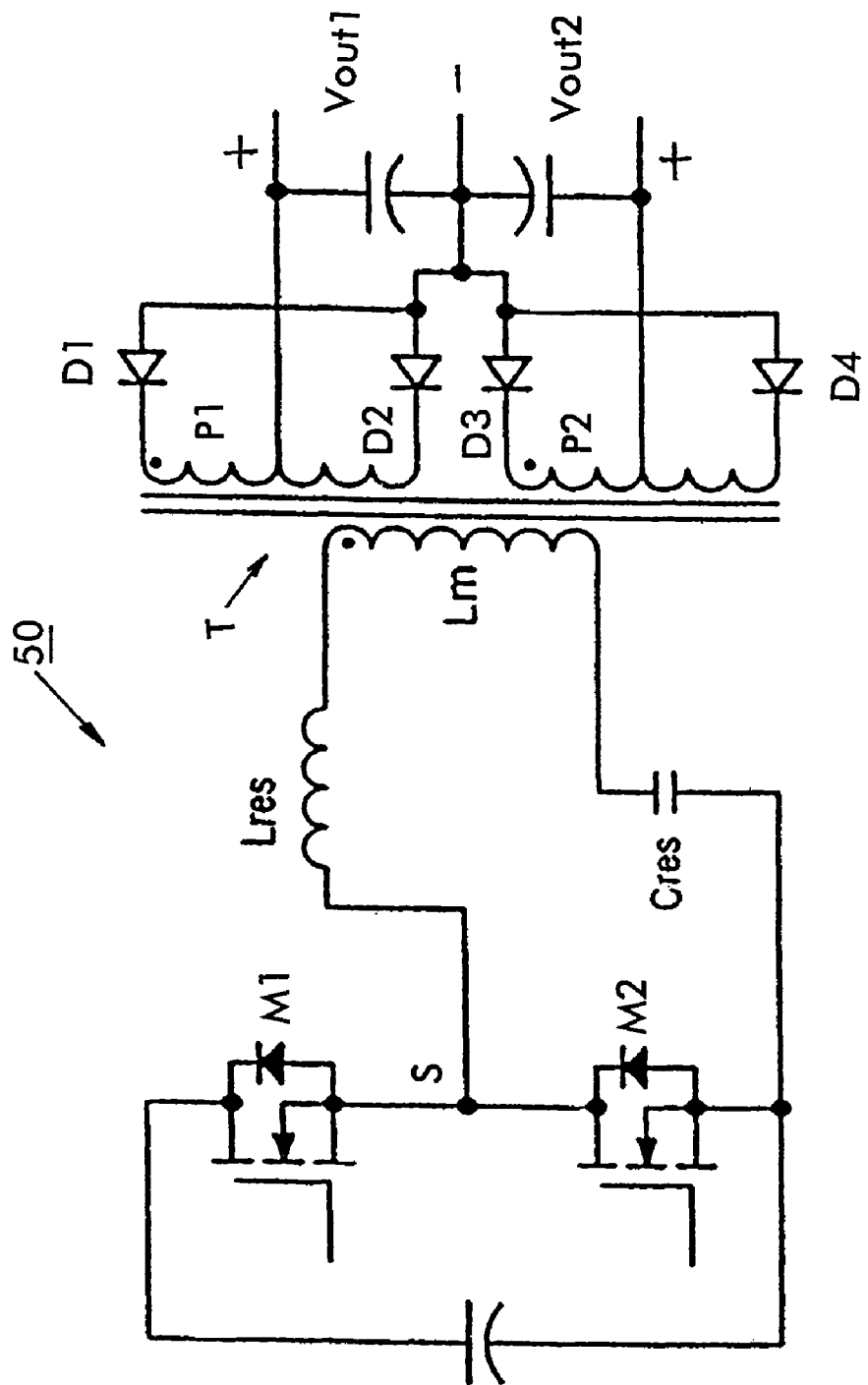
FIG. 10 is a diagram of a prior art multi-output series resonant LLC converter with Schottky diode output rectifiers.

FIG. 10 shows a prior art multi-output series resonant LLC converter 50 with Schottky diode output rectifiers D1-D4. It is desirable to implement synchronous rectification on multiple output rails by using one controller IC and enable a no-heatsink implementation in low and medium power LCD TV output rectifier stages. This solution may be implemented, for example, in a 230 W commercial LCD TV power supply where Schottky diodes are typically used.

Systems with higher conversion efficiencies and multiple output voltages have been increasingly demanded by the off-line-power-supply market. While the general market trends and government regulations have been the primary forces in driving AC-DC converter efficiency requirements, a secondary force is a function of the target applications' power requirements, as is the case in typical consumer-electronic equipment such as LCD TVs. Multiple secondary windings on the main power transformer are generally employed to derive more than one output but this implementation increases the complexity and cost for implementing synchronous output rectification on multiple rails.

Figure 11B:
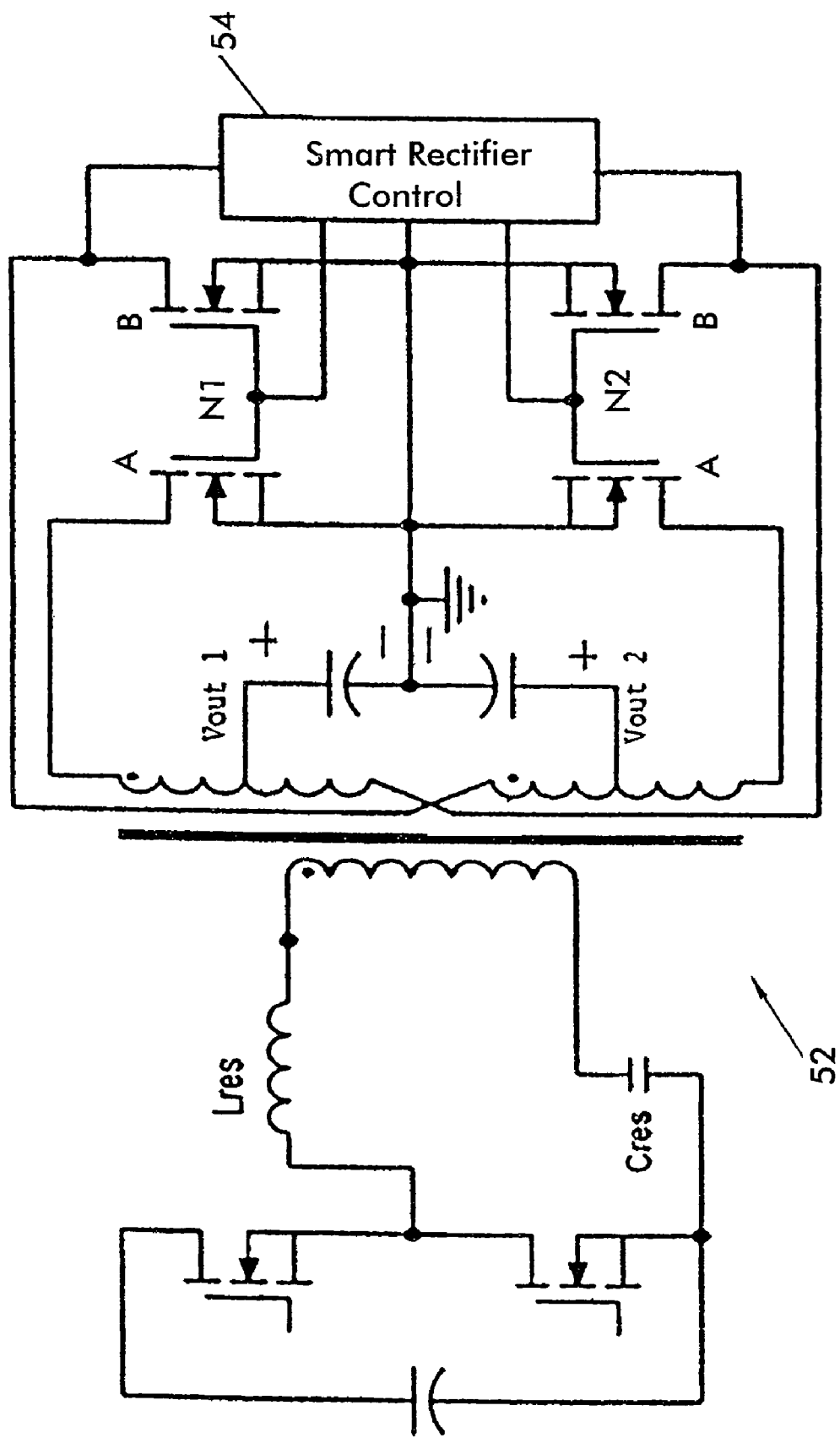
FIG. 11B is a diagram of a multi-output series resonant LLC converter with a Dual Rectifier controller IC according to the present invention.

FIG. 11B illustrates a multi-output series resonant LLC converter 52 with Dual Rectifier controller IC 54. The LLC resonant converter 52 can be used, e.g., in LCD TV power supplies. This topology offers buck/boost transfer characteristics in the soft-switching operating region that enables optimal system design for wide line and load variations. The Dual Rectifier controller IC 54 comprises dual controllers of the type shown in FIG. 5, one for each switch S1 and S2, as shown in FIG. 1a. Thus, two controllers 15 of FIG. 5 are contained in a single package to provide the full wave rectification shown in FIG. 1a.

As shown in FIG. 11B, the same Dual Rectifier controller IC 54 can be used to control the full wave rectification for two output voltages VOUT1 AND VOUT2. The Dual Rectifier controller IC 54 is a unique 8-pin controller IC that facilitates simple implementation for synchronous rectification in resonant converters, and also enables rectification on multiple output rails using a single control IC. The Dual Rectifier controller IC 54 is designed to control and drive N-Channel power MOSFETs N1 and N2 used as synchronous rectifiers in isolated DC-DC resonant converter 52. It is suited for fixed and variable frequency resonant converter applications operating up to 500 kHz.

FIG. 12 shows the internal block diagram of the Dual Rectifier controller IC 54 and its pin-out. The core of the IC are two high voltage, e.g., 200V, high speed comparators 56 and 58 which receive Sync FET drain voltage from pins $V_{D1}$ and $V_{D2}$ and Sync FET source voltage from pins $VS_1$ and $VS_2$ of the MOSFETs N1 and N2 (FIG. 11B) respectively, and differentially sense the drain to source voltage in order to determine the polarity and the level of the current. Dedicated internal logic circuits 59 and 61 turn the power devices N1 and N2 ON and OFF in close proximity of the zero-current transition. This ensures proper operations without the need of primary synchronization or external timing sources. As in the single rectifier embodiment discussed above (FIG. 5), the minimum ON and OFF time circuits 60 and 62 determine the duration of the ON and OFF signals provided by the driver circuits 59 and 61.

As in the circuit of FIG. 5, the rectifier current is sensed by the input comparators 64 and 66 using the power MOSFET RDS_ON as a shunt resistance and its GATE is driven accordingly, depending on the level of this sensed voltage compared to threshold voltages $V_{TH1}$, $V_{TH2}$ and $V_{TH3}$, shown in FIG. 5a. The more negative threshold, $V_{TH2}$, detects current through the body diode and controls the turn ON transition for the power devices N1 and N2 (FIG. 11B). Similarly, a smaller negative threshold, $V_{TH1}$, determines the level of the current at which the devices N1 and N2 turns OFF. A fixed minimum on time (MOT) ensures a minimum gate pulse width when threshold $V_{TH2}$ is triggered, preventing false turn-off and gate chattering when the device current transits between the MOSFET body diode and its channel.

As described above with reference to FIG. 7, when the conduction phase of the SR FET N1A or N2A (FIG. 11B) is initiated, the current will start flowing through its body diode, generating a negative $V_{DS}$ voltage across it. The body diode has generally a much higher voltage drop than that caused by the device channel on resistance and therefore will trigger the turn-ON threshold $V_{TH2}$. At that point, the Dual Rectifier controller IC 54 will drive the gate of MOSFET ON which will in turn cause the conduction voltage $V_{DS}$ to drop down. This drop is usually accompanied by some amount of ringing, that can trigger the input comparator to turn OFF the input comparators 64 and 66; hence, the MOT blanking period is used (min ON time) that will maintain the power MOSFET on for a minimum amount of time.

Once the SR MOSFET has been turned on, it will remain on until the rectifier current will decay to the level where $V_{DS}$ will cross the turn-off threshold $V_{TH1}$. Once the threshold is crossed, the current will once again flow through the body diode, causing the $V_{DS}$ voltage to turn negative. Depending on the amount of residual current, $V_{DS}$ may again trigger the turn-on threshold; hence, $V_{TH2}$ is blanked for an internally set blank time $t_{BLANK}$ after $V_{TH1}$ has triggered. As soon as $V_{DS}$ crosses the positive threshold $V_{TH3}$, this blanking time is terminated and the controller is ready for next conduction cycle.

The Dual Rectifier controller IC 54 is further equipped with a wide VCC operating range that allows the IC to be directly powered from the converter output. As described above, with reference to FIG. 6, the control technique of the present invention allows the synchronous MOSFET to be turned ON and OFF in very close diode emulation, thanks to the use of the same device as sensing element and low turn-ON and turn-OFF propagation delays. In this way, the highest possible performance, for a given switch, is obtained. High performance enables smaller switch sizes.

Also, the gate turn OFF is very close to the zero crossing of the IC current, which eliminates reactive power flow between the output capacitors and power transformer. Finally, the required power for controller operations is generally lower than discrete based designs, thanks to the effective integration and gate voltage clamp, i.e., 10.7V. While the converter switching frequency and gate charge to be driven rapidly increase, higher power density and more devices in parallel respectively, a significant amount of power is wasted just in gate operations. As discussed above, FIG. 7 shows the reduction in gate power losses for 4 different gate capacitances in a 50-500 kHz switching frequency range.

Figure 13:
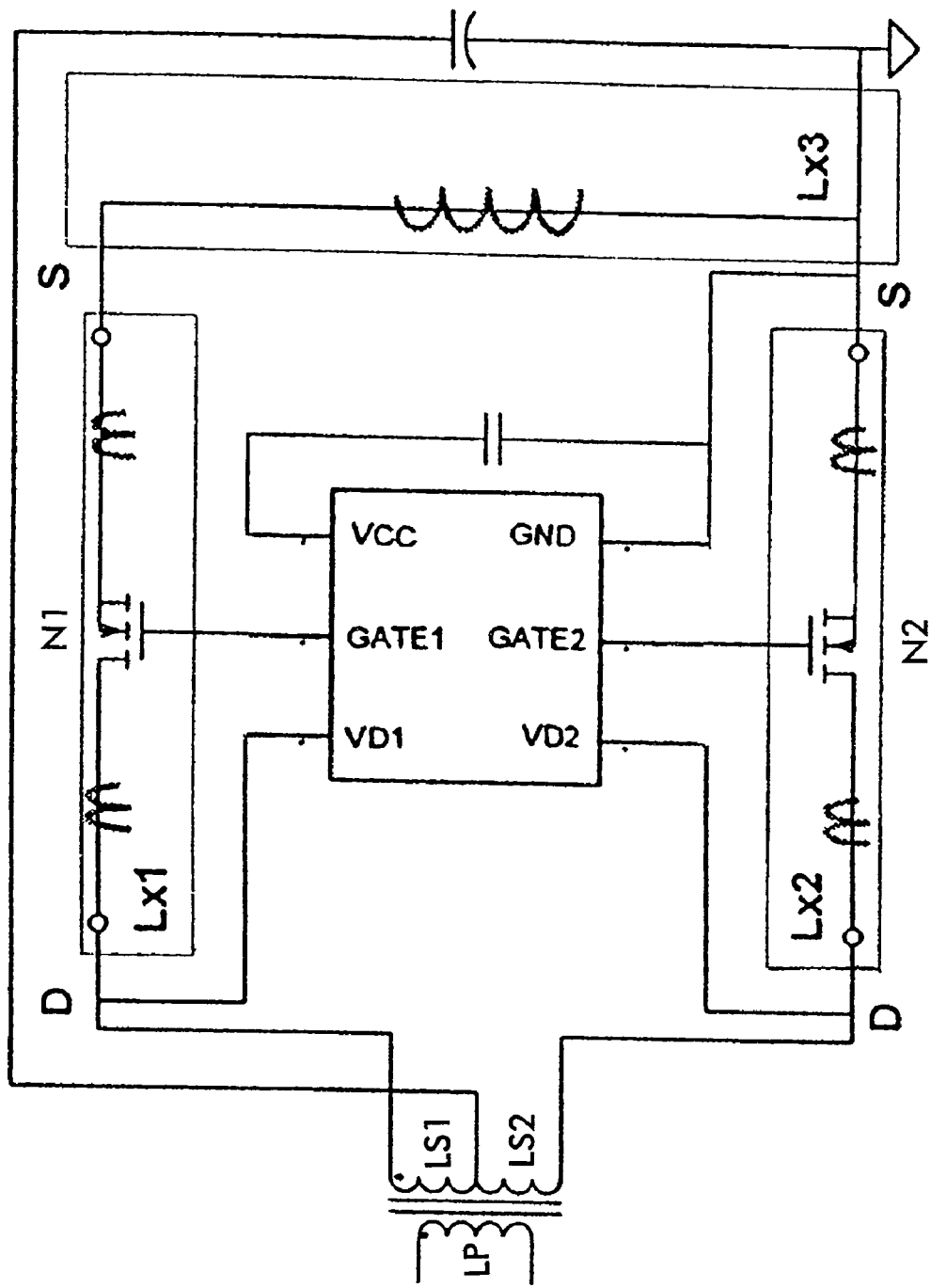
FIG. 13 is a diagram of a synchronous rectifier having absolute voltage sense control.

Because the topology of the Dual Rectifier controller IC 54 is resonant in nature, the changing current slope can degrade the effectiveness of the voltage-sensing control technique. In typical MOSFET voltage sensing control implementations for output rectification, the sinusoidal nature of the current induces offsets in the actual measurements, and hence, compromises system performance. FIG. 13 illustrates a possible physical implementation with absolute voltage-sense control, in which the SyncFET output current and the control IC sensing loop share a common path.

Figure 14:
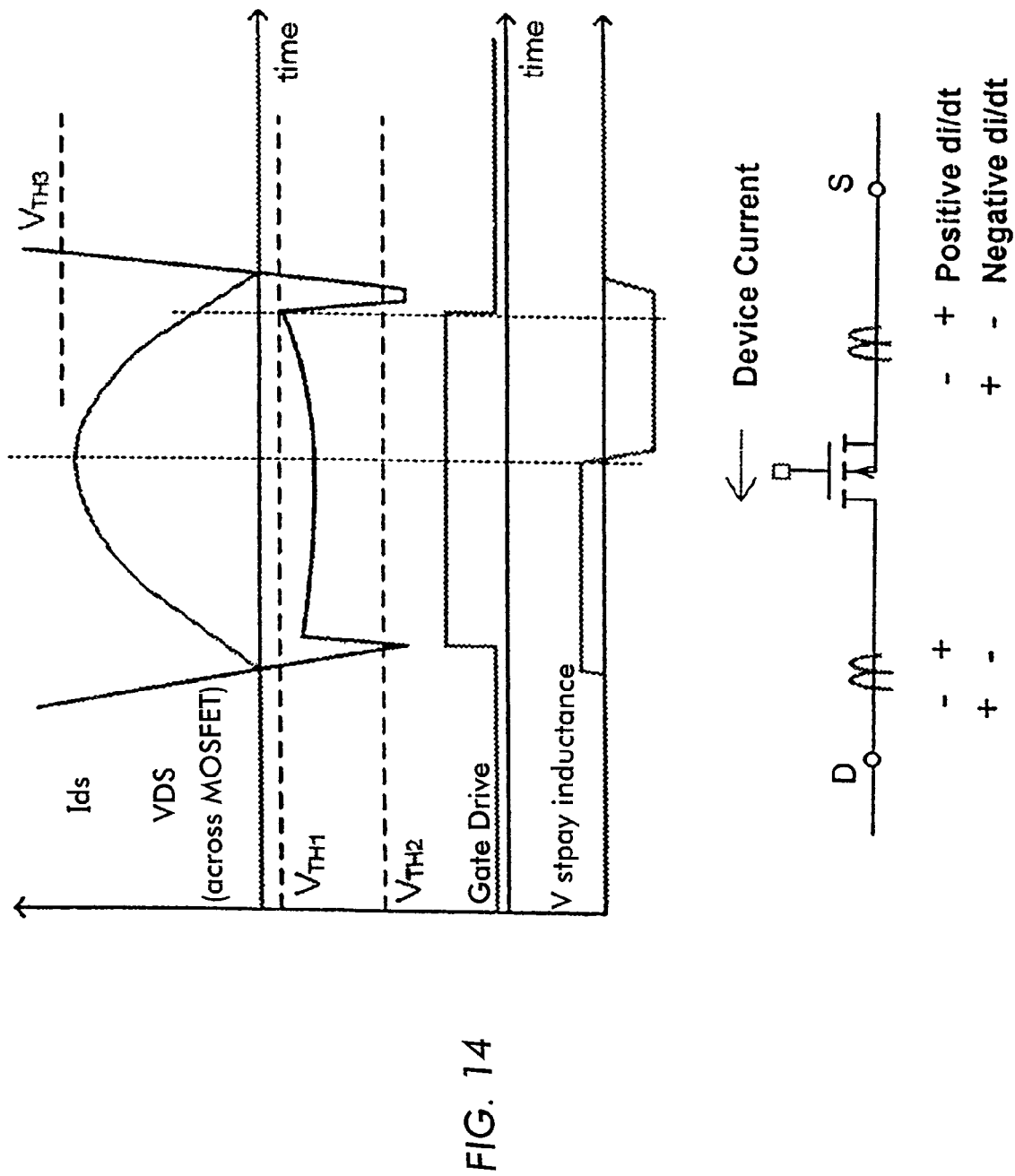
FIG. 14: is a graph showing effect of device package inductance on the performance of voltage-sense control.

Though the PCB layout can be optimized, obtaining a true Kelvin contact to the MOSFET depends on the device's package. As shown in FIG. 14, even a small inductance with a normal current slew rate can cause a voltage drop in the range of a control IC's threshold levels, which in turn adds to the purely resistive drop in the rectifier. Additionally, the actual distance between the two output rectifiers on the PCB, create the need for pure differential voltage sensing on both devices for optimal rectifier performance. When the device current decays (negative di/dt), the polarity of the voltage across the stray inductance in the IC sensing loop reverses, i.e., it goes out of phase with IDS*RDS. As a result, the net voltage seen across the MOSFET drain to source terminals, i.e., the voltage sensed by the IC is lower, and hence, causes the controller to turn-OFF the output rectifiers earlier.

Figure 15:
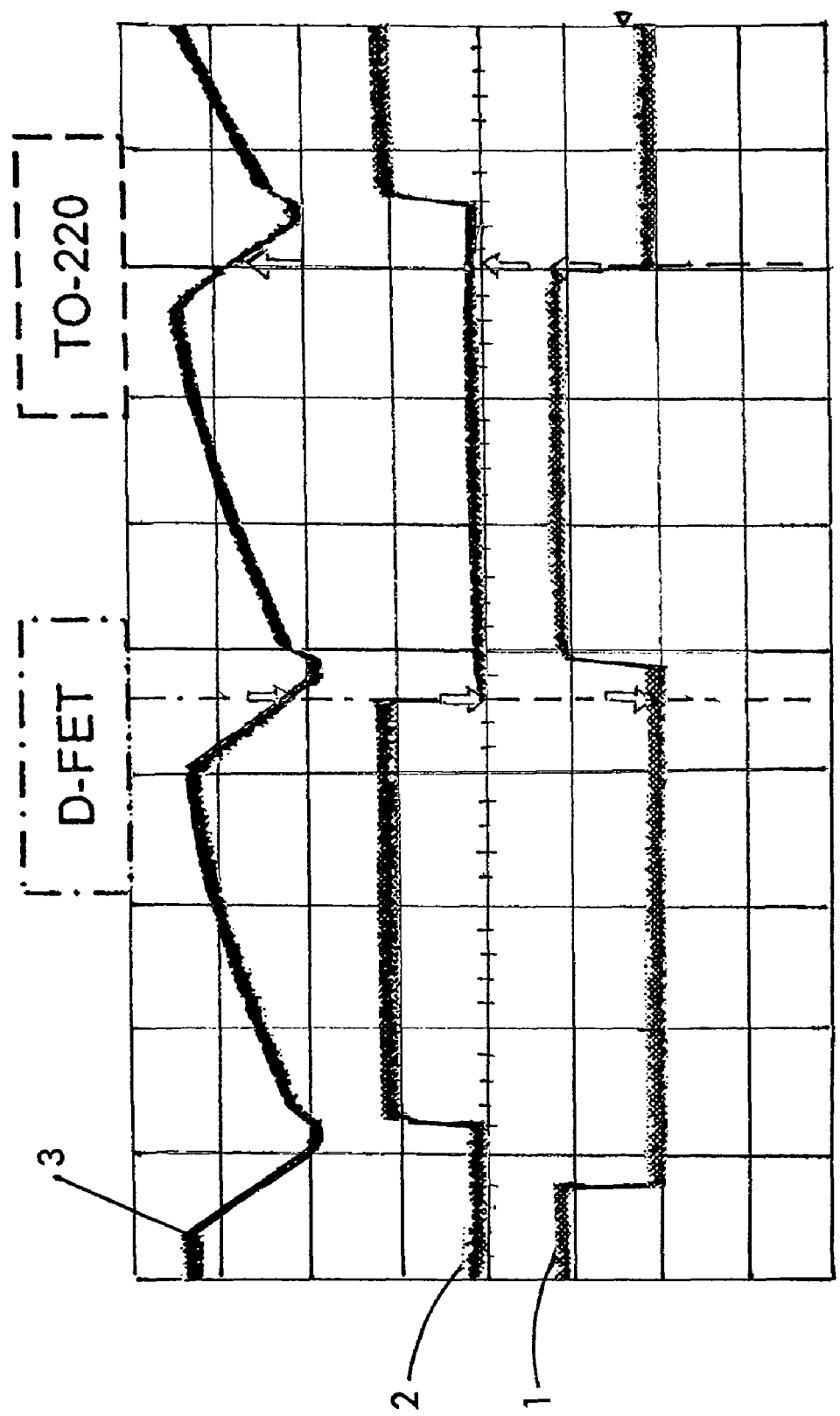
FIG. 15 is a graph showing waveforms achieved with DirectFET and TO220 packages.

FIG. 15 shows the influence of the MOSFET package as was verified by using two different output rectifiers Direct-FET and TO220 package. Kelvin contacts were made for both the devices. Graph 1 shows TO220 MOSFET $V_{GS}$ voltage;

Graph 2 shows D-FET MOSFET $V_{GS}$ voltage; and Graph 3 shows rectified current in the secondary winding voltage.

Multiple taps on the secondary of the main power transformer are generally used to generate the different output voltage rails, hence, the current through their output rectifiers overlap. Assuming a minimum current loading on the output rails (a common operating condition in a majority of LCD TV power supplies), the SyncFET gate signals from $V_{DS}$ sensing on one power rail can serve to drive the MOSFETs on a second rail. This implementation results in a cost-effective solution for output synchronous rectification. Power supply designers adopting this approach must select the proper sensing rail to ensure optimal performance; longer gate pulses would result in reverse current through the rectifier MOSFETs, while shorter gate pulses would result in excessive body-diode conduction. This concept is demonstrated in a 230 W commercial LCD TV power supply (24V/7.5 A, 12V/3 A and 5V/4 A), that was initially designed with Schottky diodes on the two main output rails. The 5V rail is generated by stepping down the 12V rail. This solution would not be optimum in performance as compared to using one Dual Rectifier controller IC 54 on each output rail. This implementation would however offer a lower cost solution with improved performance as compared to the existing Schottky diode+heat-sink implementation. A 50% minimum loading for the output rails is assumed for the present purpose.

Figure 16:
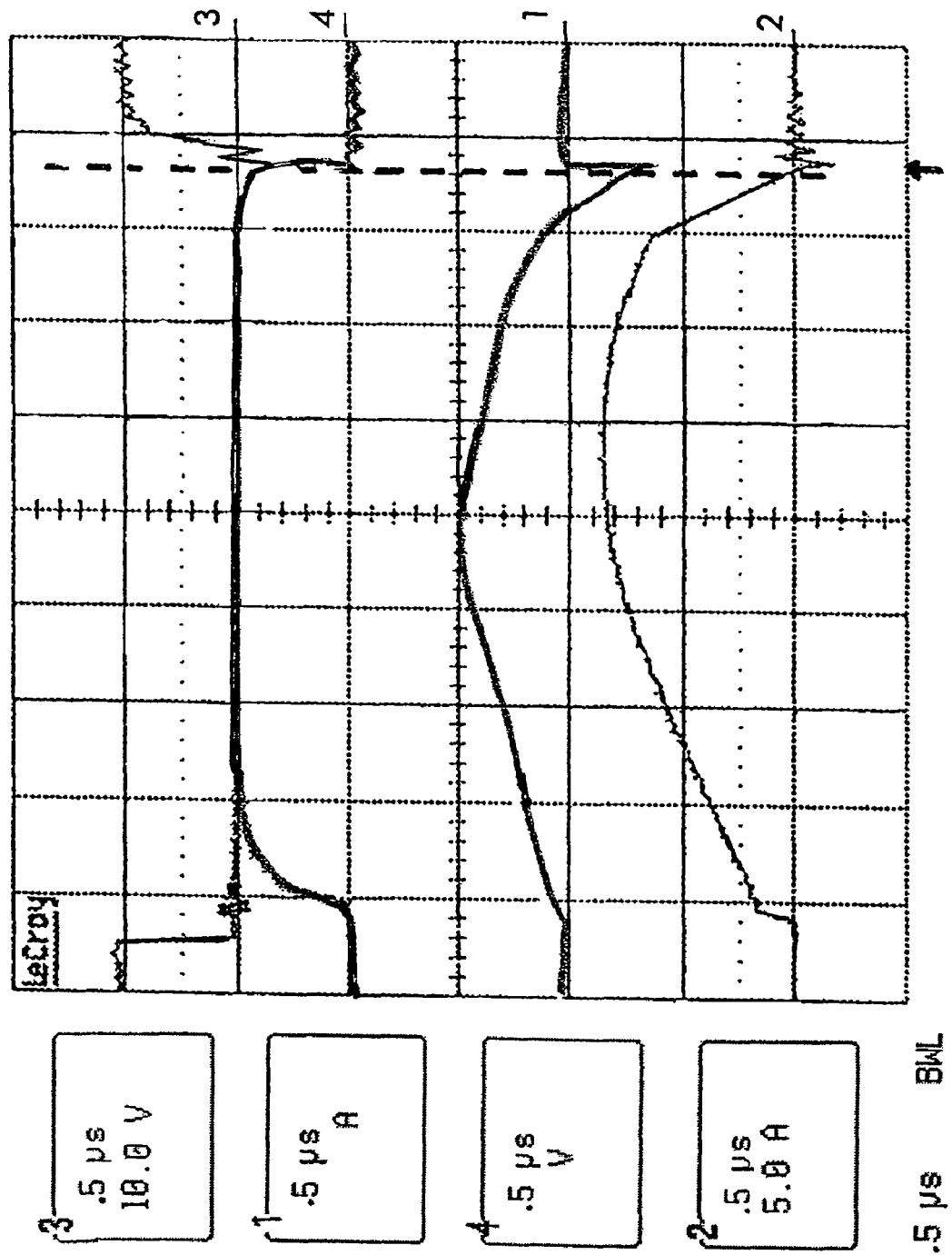
FIGS. 16 and 17 are graphs showing waveforms achieved at full load by 12V and 24V rail rectifier current.

FIG. 16 shows waveforms of a Dual Rectifier controller IC 54 implementation at full load. The Dual Rectifier controller IC 54 is sensing only on the 24V rail and using the same gates for the 12V rail MOSFETs. In a LCD TV power supply, the 24V rail alone delivers a significant portion of the total output power. Hence, if the gate signals from the 24V rectifier sensing are used for the 12V rectifiers, gate pulses with larger pulse width result in a reverse current across the 12V rectifiers. This is shown in FIG. 16 by Graph 1 showing 12V rail rectifier current; Graph 2 shows 24V rail rectifier current; Graphs 3 and 4 show gate signal outputs GATE 1 and GATE 2 of the Dual Rectifier controller IC 54.

Figure 17:
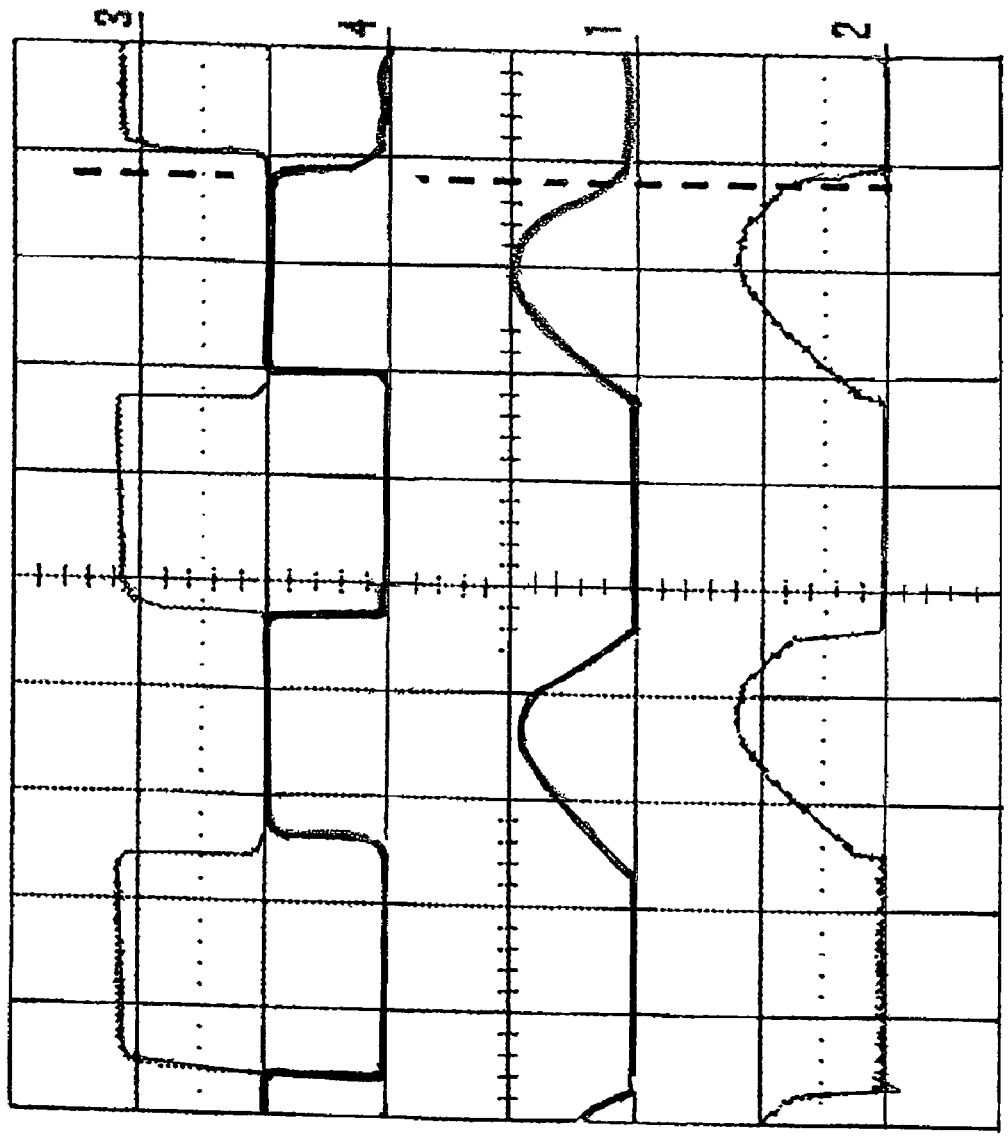

FIG. 17 shows waveforms of the Dual Rectifier controller IC 54 at full load. The Dual Rectifier controller IC 54 is sensing only on the 12V rail and using the same gates for the 24V rail MOSFETs. The rectifier current for the 12V rail falls to zero earlier as compared to the 24V rail; hence, with this sensing configuration, the gate signals for the 24V rectifiers would turn-off earlier. This is shown in FIG. 17 by Graph 1 showing 12V rail rectifier current; Graph 2 shows 24V rail rectifier current; Graphs 3 and 4 show gate signal outputs GATE 1 and GATE 2 of the Dual Rectifier controller IC 54. Note that the minimum loading requirement on the 12V rail prevents excessive body-diode conduction for the 24V rail MOSFETs.

Thermal and efficiency measurements with respect to the solutions illustrated in FIGS. 16 and 17 were performed in a thermal chamber regulated at 25° C. For the initial unit characterization, two T-type thermocouples were glued on one of the two TO220 rectifier diodes on the 24V and 12V rail. After the retrofit, the temperature on one of the two secondary S08 MOSFET rectifiers was monitored. The SO8 rectifier MOSFETs on both output rails were operating without any heat sinks.

Figure 18:
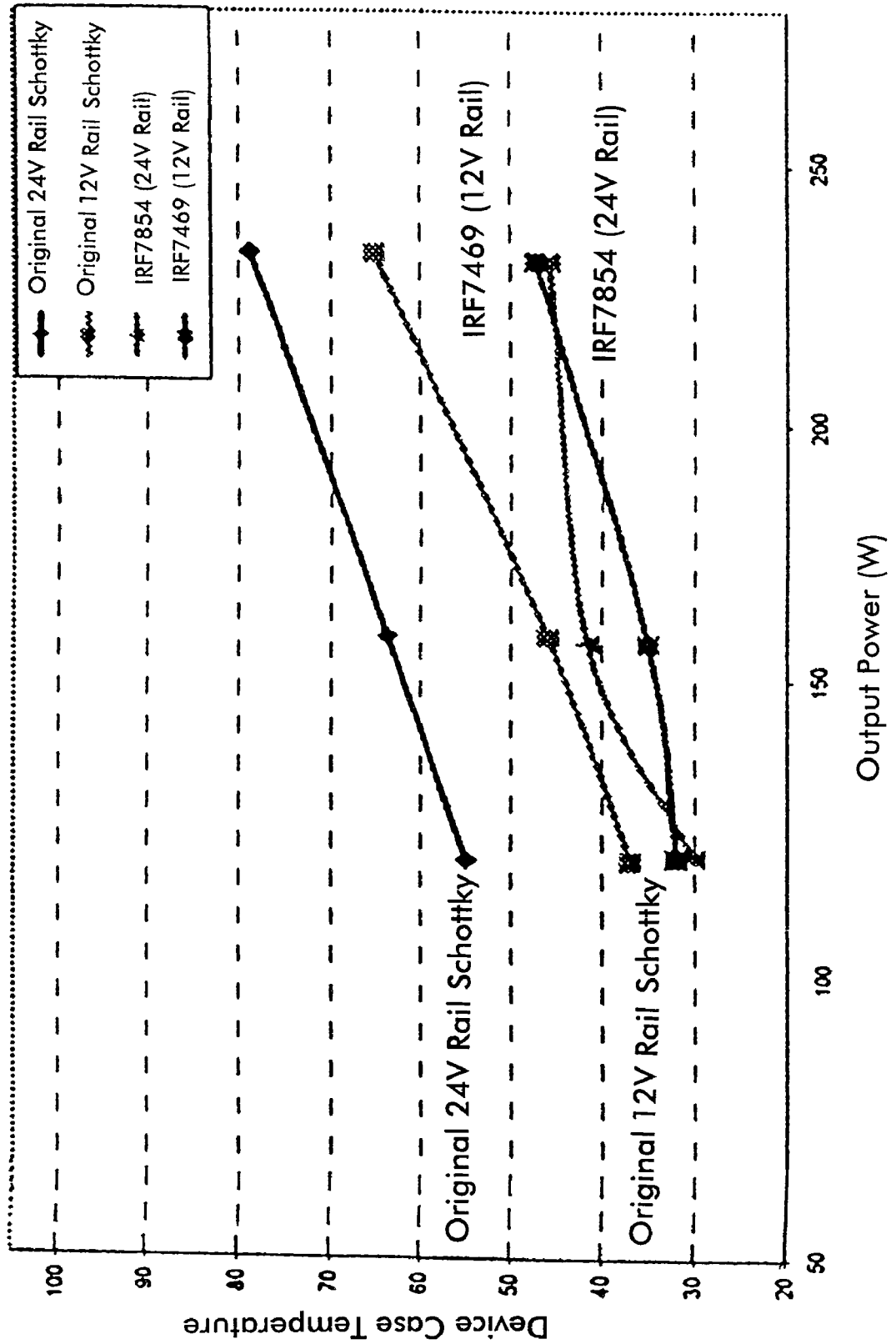
FIGS. 18 and 19 are graphs showing comparison of system thermal performance and efficiency with one Dual Rectifier controller IC of FIGS. 11A and 11B on the 12V rail only.
Figure 19:
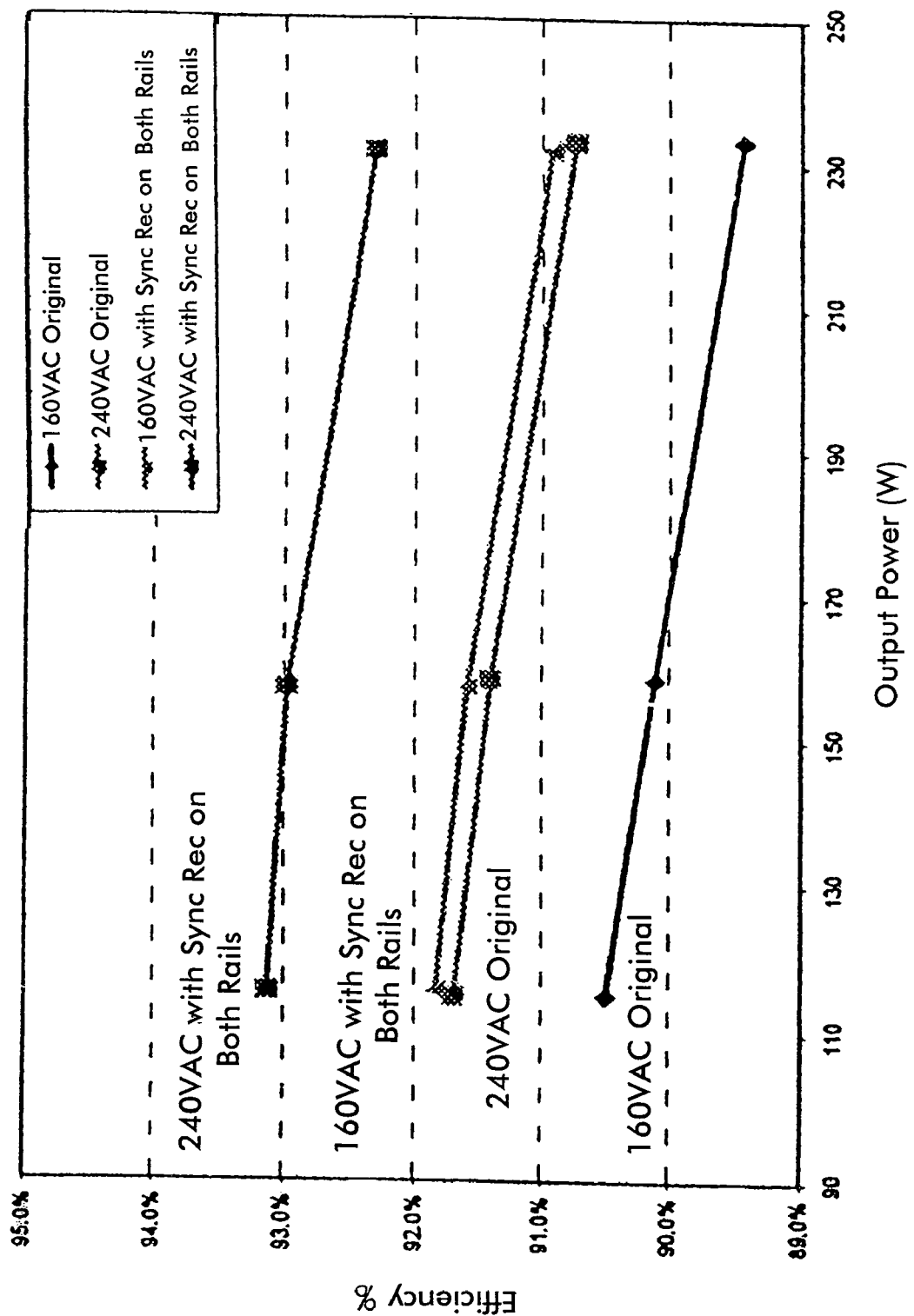

FIG. 18 illustrates graph comparing system thermal performance ($T_A$=25 C) with one Dual Rectifier controller IC 54 on the 12V rail current sensing only. FIG. 19 illustrates graph comparing system thermal performance ($T_A$=25 C) with one Dual Rectifier controller IC 54 on both rails. It can be observed from FIG. 18 and FIG. 19 that the retrofit results in superior system performance in both, efficiency and device thermals, as compared to the original Schottky diode and heat sink implementation. Finally, it is important to note that with this implementation, the limitations of the device package inductance can be minimized by selecting one optimal output rail for the controller and DirectFETs, while the remaining outputs can use any viable package, without affecting synchronous rectification operations.

Dedicated logic and effective high-voltage differential sensing of the Dual Rectifier controller IC 54 enables optimized synchronous rectification function in resonant topologies. As discussed, the resonant converter described with synchronous rectification has enhanced performance over present implementations. The solution allows achieving higher efficiency and enables a no-heatsink implementation in low and medium power LCD TV output rectifier stages.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A resonant converter comprising:
   a primary side switching stage having high- and low-side switches series connected at a switching node and controlled by a primary side controller;
   a transformer having a primary coil and a secondary coil, the secondary coil having at least one pair of portions series connected at a node, a resonant tank formed by series connecting the primary coil to the switching node with a first inductor and a first capacitor;
   at least one pair of first and second secondary side switches connected to the at least one pair of portions, respectively, the first and second secondary switches of each pair being used for synchronous rectification; and
   a secondary side controller to control and drive the first and second secondary side switches of each pair by sensing voltage across each secondary side switch, comparing said voltage across each secondary side switch with a programmable threshold, and determining a turn ON and turn OFF transition for the first and second secondary side switches in close proximity to a point in time when there is zero current through the secondary side switch to achieve synchronous rectification.

2. The resonant converter of claim 1, wherein the secondary side controller is an integrated circuit (IC) providing gate outputs for the at least one pair of first and second secondary side switches.

3. The resonant converter of claim 1, wherein the secondary side controller comprises:
   a comparator for comparing the drain-source voltage of the secondary side switch to said programmable threshold to turn the secondary side switch off and another threshold to turn the secondary side switch on;
   further comprising a circuit for setting a minimum time when the secondary side switch is being turned on; and
   a driver circuit for driving the secondary side switch.

4. The resonant converter of claim 3, further wherein the secondary side controller includes a minimum off time circuit that maintains the secondary side switch off for a minimum off time when the controller turns the secondary side switch off.

5. The resonant converter of claim 4, wherein the minimum off time is determined by a circuit generating a third threshold value for comparison to said drain-source voltage of the secondary side switch.

6. An integrated circuit for a resonant converter, wherein the resonant converter has:
- a primary side switching stage having high- and low-side switches series connected at a switching node and controlled by a primary side controller;
- a transformer having a primary coil and a secondary coil, the secondary coil having at least one pair of portions series connected at a node, a resonant tank formed by series connecting the primary coil to the switching node with a first inductor and a first capacitor; at least one pair of first and second secondary side switches connected to the at least one pair of portions, respectively, the first and second secondary side switches of each pair being used for synchronous rectification;
- the integrated circuit comprising: a secondary side controller for controlling and driving the first and second secondary side switches of each pair by sensing voltage across each secondary side switch, comparing the voltage with a programmable threshold, and determining a turn ON and turn OFF transition for the first and second secondary side switches in close proximity to a point in time when there is zero current through the secondary side switch to achieve synchronous rectification, wherein the secondary side controller for controlling the at least one pair of first and second secondary side switches is contained in one IC package.

7. A secondary side synchronous rectifier for a resonant converter, the secondary side synchronous rectifier comprising:
- a sensing circuit to sense a voltage across a first secondary side switch and a second secondary side switch of the resonant converter;
- at least one comparison circuit using a programmable reference voltage to determine a zero current condition through the first secondary side switch and the second secondary side switch; and
- a driver circuit configured to switch the first secondary side switch and the second secondary side switch if the comparison circuit detects the zero current condition.

8. The secondary side synchronous rectifier of claim 7, wherein the zero current Condition corresponds to a node voltage at a node connecting the first secondary side switch and the second secondary side switch.

9. The secondary side synchronous rectifier of claim 7, wherein the resonant converter further comprises a first primary side switch and a second primary side switch.

10. The secondary side synchronous rectifier of claim 7, wherein the first secondary side switch comprises a metal-oxide-semiconductor field-effect transistor (MOSFET).

11. The secondary side synchronous rectifier of claim 7, wherein the comparison circuit is configured to compare a terminal voltage of the first secondary side switch to said programmable reference voltage.

12. The secondary side synchronous rectifier of claim 11, wherein the comparison circuit is configured to compare a terminal voltage of the second secondary side switch to another reference voltage.

13. The secondary side synchronous rectifier of claim 12, wherein the terminal voltage of the second secondary side switch corresponds to a source voltage of a metal-oxide-semiconductor field-effect transistor (MOSFET).

14. The secondary side synchronous rectifier of claim 7, wherein the terminal voltage of the first secondary side switch corresponds to a drain voltage of a metal-oxide-semiconductor field-effect transistor (MOSFET).

15. The secondary side synchronous rectifier of claim 7, further comprising a reset circuit configured to set a node voltage at a node connecting the first secondary side switch and the second secondary side switch to substantially zero Volts (V) based on a comparison with a third reference voltage.

16. The secondary side synchronous rectifier of claim 7, wherein the secondary side synchronous rectifier is packaged into an integrated circuit (IC).

\* \* \* \* \*